United States Patent [19]

Suda et al.

[11] Patent Number: 4,618,354
[45] Date of Patent: Oct. 21, 1986

[54] METHOD, APPARATUS AND BURNER FOR FABRICATING AN OPTICAL FIBER PREFORM

[75] Inventors: Hiroyuki Suda; Shuichi Shibata; Motohiro Nakahara, all of Mito, Japan

[73] Assignee: Nippon Telegraph & Telephone Public Corporation, Tokyo, Japan

[21] Appl. No.: 705,362

[22] Filed: Feb. 25, 1985

[30] Foreign Application Priority Data

| Feb. 27, 1984 | [JP] | Japan | 59-34300 |
| Mar. 1, 1984 | [JP] | Japan | 59-37223 |
| Feb. 12, 1985 | [JP] | Japan | 60-23486 |
| Feb. 12, 1985 | [JP] | Japan | 60-23487 |
| Feb. 12, 1985 | [JP] | Japan | 60-23488 |

[51] Int. Cl.$^4$ .......................................... C03F 37/018
[52] U.S. Cl. ............................... 65/2; 65/18.2; 65/3.12
[58] Field of Search ............... 65/18.2, 3.12, 157, 65/144, 2, 29

[56] References Cited

U.S. PATENT DOCUMENTS

| 2,188,121 | 1/1940 | Smith | 65/3.12 X |
| 4,388,098 | 6/1983 | Takahashi | 65/157 |
| 4,428,762 | 1/1984 | Andrejco | 65/18.2 X |

Primary Examiner—Kenneth M. Schor
Attorney, Agent, or Firm—Spencer & Frank

[57] ABSTRACT

In an optical fiber preform fabrication method having the steps of decomposing a glass raw material in a flame so that fine glass particles are produced; depositing the fine glass particles on a seed rod to form a porous preform; and consolidating the porous preform into a transparent optical fiber preform, use is made of a burner having a raw material supply orifice for supplying the glass raw material and a plurality of flame forming orifices disposed around the raw material supply orifice sequentially for forming a plurality of flames, respectively. The flame speed $V_k$ of a kth flame, the flame speed $V_{k+1}$ of a (k+1)th flame surrounding outwardly of the kth flame and the flow speed Vm of the glass raw material are determined in a suitable manner. The glass raw material is supplied to the maluti-flame produced by the burner in which the kth flame is positioned rearwardly of the (k+1)th flame to synthesize the fine glass particles.

10 Claims, 22 Drawing Figures

FIG_11

METHOD, APPARATUS AND BURNER FOR FABRICATING AN OPTICAL FIBER PREFORM

BACKGROUND OF THE INVENTION

1. Field of the Invention

The present invention relates to a method, an apparatus and a burner for fabricating an optical fiber preform in an efficient and stable manner at a high fabrication rate.

2. Description of the Prior Art

Optical fiber preforms are fabricated by the MCVD (Modified Chemical Vapor Deposition) method, the OVD (Outside Vapor Deposition) method or the VAD (Vapor-phase Axial Deposition) method. One of the most important problems in the production of optical fibers is how to produce high quality optical fibers in an economical way by these processes; that is, how to produce a large amount of optical fiber during a short period of time so that their cost can be reduced. It has been expected that this problem can be solved especially by a process capable of fabricating large optical fiber preforms at a higher rate.

In order to attain a high synthesizing rate in the VAD process, fabrication process using plural burners in a multi-stage and an improvement in burner have been considered. In the case of an optical fiber preform fabrication process using plural burners in a multi-stage, plural burners are disposed around the area where a porous preform is grown. Therefore, the synthesizing rate can be increased with the increase in the number of burners. However, when compared with an optical fiber preform fabrication process using only one burner, the preform fabrication process using plural burners in a multi-stage is inferior in characteristics, stability and reproducibility, because of the interference between the flames from the plural burners.

In the case of an optical fiber preform fabrication process with only one burner, raw materials for glass must be supplied in a larger amount in order to synthesize a porous preform at a high rate, but when the supply of the raw materials for glass is increased, an amount of the raw materials which have not reacted is also increased and consequently the flame stream is disturbed. As a result, there arises the problem that the yield is reduced.

Meanwhile, in order to fabricate a porous preform of a large diameter, there has been proposed a process in which a flow rate is taken into consideration so as to optimize the fabrication conditions as disclosed in "Fine Glass Particle-Deposition Mechanism in the VAD Process", by H. Suda et al., Fiber and Integrated Optics, Vol., 4, No. 4, pp. 427–437. However, a yield obtained by this process is too low to be employed as a process for fabricating porous preforms.

In the case of the fabrication of large optical fiber preforms at a high rate by the VAD process, an amount of the supply of raw materials for glass must be increased. Therefore, in order to improve the reaction efficiency of glass raw materials, there has been proposed a method in which a multi-flame consisting of a plurality of flames surrounded by each other is used. For instance, Japanese patent application No. 219,380/1983 which was filed Nov. 24, 1983 by the same inventors and which has not been laid-open and accordingly does not constitute prior art discloses "A burner for use in synthesis of fine glass particles" in which the effective flame length is increased by using double-flames consisting of an inner flame and an outer flame surrounding the inner flame and by spacing the inner flame rearwardly of the outer flame so as to control the size of fine glass particles.

FIG. 1 shows a construction of a double-flame burner as one example of such a multi-flame burner of the type described above. In FIG. 1, reference numeral 1 denotes an inlet for supplying glass raw materials which are to be charged into an inner flame 8; 2, an inlet disposed around the raw material supply inlet 1 for supplying a combustible gas for the inner flame 8; 3, an inlet disposed around the combustible gas supply inlet 2 for supplying glass raw materials which are to be charged into the outer flame 9; and 4, an inlet disposed around the raw material supply inlet 3 for supplying a combustible gas for the outer flame 9. Reference numeral 5 denotes an orifice for the inner flame; and 6, an orifice for the outer flame. The orifices 5 and 6 are independent of each other. Reference numeral 7 denotes a layer of raw materials reacting in the inner flame 8; 10, produced fine glass particles; and 11, a porous preform which is growing. a represents the length of the inner flame 8; and b, the length of the double flame consisting of the inner and outer flames 8 and 9. The inner flame orifice 5 is retractably disposed with respect to the outer flame orifice 6 so that the inner flame 8 can be spaced rearwardly of the outer flame 9 by a distance l. The distance l can be adjusted in response to an amount of the supply of glass raw materials.

In the case of the double-flame fabrication process, the increase in flame length due to the outer flame results in the increase in an amount of the fine glass particles deposited. In other words, when the double-flame fabrication process is employed, a deposition rate of fine glass particles is increased. Especially, the greater an amount of a glass raw material, the more remarkable the advantageous effect of the double-flame fabrication process becomes.

A possible explanation for such an effect follows. The increase in flame length accelerates the decomposition of a glass raw material so that a passing time period during which the fine glass particle passes through the flame region is increased and consequently the fine glass particle synthesized is increased in size.

FIG. 2 shows the relationship between a passing time during which the fine glass particle passes through the flame region and a specific surface area of the fine glass particles when the double-flame fabrication process is employed. FIG. 2 clearly shows that the longer the passsing time during which the fine glass particle passes through the flame region, the smaller the specific surface area of the fine glass particles becomes and the larger the particle size of the fine glass particle becomes. It follows, therefore, that when the flame length is increased, the passing time during which the fine glass particle passes through the flame is increased and consequently the size of the fine glass particle is enlarged.

In summary, when a double-flame burner is used and the inner orifice thereof is spaced rearwardly of the outer orifice, it is expected that the size of the fine glass particle can be increased and consequently the deposition rate of fine glass particles is also increased. Thus, optical fiber preforms can be synthesized at a high rate.

The transmission state of light through an optical fiber is dependent on a diameter of a core, the difference in refractive indexes between a core and a cladding, a refractive index profile and so on. Various combinations of these factors provide optical fibers with a variety of desired properties and characteristics. So far, in order to control the diameter of a core, the diameter of a preform is controlled. A difference in refractive indexes and a desired refractive index profile can be controlled by controlling a concentration distribution of a dopant which is added to the glass raw materials to control a refractive index. Typical dopants are $B_2O_3$, $GeO_2$, $TiO_2$, $P_2O_5$ and the like. For instance, see "Refractive-Index Profile Control Techniques in the Vapor-Phase Axial Deposition Method" by Sudo et al., The Transactions of the IECE of Japan, Vol. E64, No. 8, Aug. 1981. It is known that the concentration of the dopant $GeO_2$ is dependent on the temperature distribution over a growing surface of a preform which is being synthesized.

FIG. 3 shows the relationship between a surface temperature of a porous preform deposited when the mixture of $SiCl_4$, which is a raw material for $SiO_2$, and an additive of $GeCl_4$ are introduced into a burner and a $GeO_2$ concentration. When the surface temperature is maintained in a range between 500° and 800° C., the noncrystalline form $GeO_2$ which is effective in determining a desired difference in refractive indexes is added in proportion to a temperature (See THE TRANSACTIONS OF THE INSTITUTE OF ELECTRONICS AND COMMUNICATION ENGINEERS OF JAPAN Vol. J65-C, No. 4, 1982, pp. 292-299). The above-described relation is utilized in a conventional VAD process in such a way that a desired surface temperature distribution of a deposition region of a porous preform being synthesized is maintained by controlling the position relationship of a porous preform being synthesized with respect to a synthesizing burner into which a glass raw material and additive raw material are introduced and by controlling amounts of a combustible gas and a burn-supporting gas introduced into the burner so that a difference in refractive indexes and a desire refractive index profile are controlled to synthesize an optical fiber preform (Japanese patent application No. 75,934/1980 or U.S. Pat. No. 4,367,085 which corresponds to the Japanese patent application No. 75,934/1980). In case of a multi-flame burner, however, a technique of controlling a refractive index profile has not been established.

As described above, when a multi-flame burner is used, the effect of controlling the size of fine glass particles has be confirmed, but the improvement of the reaction efficiency of a glass raw material has not been satisfactory. Moreover, in the case of the actual fabrication of preforms, there arise the problems that the growth of a preform is not stable (resulting in cracks in porous preforms and disturbances in the growing surfaces of porous preforms) due to an non-uniform flame temperature distribution, and that a refractive index profile cannot be controlled. Under some conditions for supplying various gases in the fabrication of porous preforms, the growth of porous preforms becomes extremely slow or becomes non-stable. Therefore, it has been very important to throughly comprehend the conditions under which preforms can be fabricated with a high degree of reproducibility so that a fundamental fabrication process can be established.

Furthermore, an optical fiber which is obtained by drawing an optical fiber preform comprises at least a core through which light is transmitted and a cladding which surrounds the core. Therefore, in the case of the fabrication of a preform, fine glass particles with different composition types are deposited in such a way that the structure of a preform thus obtained is substantially similar to that of an optical fiber with desired structure and characteristics. In order to fabricate optical fiber preforms with a fundamental structure consisting of a core and a cladding, the following two processes are generally employed.

One process is called a partial synthesizing process in which a preform containing a portion corresponding to the core of an optical fiber or the core and a part of the cladding is synthesized by the VAD process. The core portion is consolidated into transparent glass, and then the preform is inserted into a quartz tube as a cladding to form integrally a preform. According to this process, only a core and a portion surrounding the core through which light transmits are formed by the deposition of fine glass particles which takes a long time and an outer cladding which has less influence on the transmission of light through an optical fiber is made of a quartz tube. Even though a quartz tube used in this process has less influence upon the transmission of light, the quartz tube has some influence on the mechanical strength of an optical fiber drawn. Therefore, it is necessary to use a quartz tube with a high degree of purity. As a result, there arise the problems that two steps are required and that the fabrication cost is expensive.

The other process is called an all synthesizing process in which fine glass particles for forming a core and fine glass particles for forming a cladding are so deposited that a porous preform with a desired cladding-to-core-diameter ratio can be obtained. In general, a cladding must be made thick. For this reason, burners for synthesizing a cladding must be provided in a plurality of stages.

Table 1 below shows the fabrication processes, required cladding-to-core-diameter ratios and required weight ratios of typical optical fibers used in communication systems at present.

TABLE 1

| Types optical fiber | Fabrication Process | Core diameter (μm) | weight of core glass (relative value) | Synthesized cladding diameter (μm) | weight of cladding glass (relative value) |
|---|---|---|---|---|---|
| graded index type fibers | all synthesis | 50 | 1 | 125 | 5.25 |
| large core fibers | all synthesis | 80 | 1 | 150 | 2.51 |
| single mode fiber | partial synthesis of cladding | 10 | 1 | 50 | 24 |
|  | all synthesis | 10 | 1 | 125 | 155.25 |

When a conventional burner is used, fine glass particles can be synthesized at a maxium rate of 1.7 g/min and many burners must be arranged in a plurality of stages in order especially to form the cladding of a preform as shown in Table 1. The above-described process has the problems that it takes a long time before a preform which is being synthesized is brought into steady state, that the length of a preform becomes long before the preform is brought into steady state, and that it is impossible to fabricate a preform in a stable manner for a long time period due to the interference among the plural burners. These problems arise typically in the case of the fabrication of preforms for single mode optical fiber as shown in Table 1. Therefore, in order to synthesize a preform for single mode optical fiber, cladding burners must be disposed in 3-5 stages and a diameter of a preform for a core must be made small. This is the reason why some of the single mode optical fibers shown in Table 1 are fabricated by the partial synthesis of cladding, which corresponds to the former process.

In the fabrication of optical fibers in various types, it is difficult to attain a high manufacturability merely by arranging synthesizing burners with the same performance in a plurality of stages. Therefore, the studies on the burners having different performance have been made.

In the case of the fabrication of preforms for single mode optical fibers by the all synthesis process, in order to increase a cladding-to-core-diameter ratio, there has been proposed a process in which fine glass particles are deposited in such a way that a diameter of a preform for a core is made as small as possible. However, it is known that even when the diameter of a burner is reduced or an amount of a raw material supplied to a burner is decreased, the diameter of a porous preform obtained cannot be reduced less than 20 mm. In order to deposit porous preforms with a diameter less than 20 mm, Japanese patent application Nos. 129,530/1979 and 93,841/1980 or corresponding U.S. Pat. No. 4,345,928 proposed the use of an eccentric burner in which a raw material supply port is disposed eccentrically in a cross section of the burner. The eccentric burner is used in such a way that the eccentric raw material supply inlet is directed downward. As a result, the fine glass particles which are being synthesized in the flame can be prevented from spreading in the lateral direction so that a preform with a diameter less than 20 mm can be synthesized.

Another method for obtaining a high cladding-to-core-diameter ratio is to enlarge a cladding system. In this method, however, the same problems as described above arise when a large number of burners are used. Therefore, it has been desired to invent a fabrication method with a high performance burner which has a deposition rate per burner is increased.

Furthermore, when porous preforms become large in size by increasing a synthesis rate, the following problems arise when they are consolidated.

A large porous preform was placed in an electric furnace and consolidated under the same conditions as employed when porous preforms fabricated by the conventional VAD process are subjected to consolidation. The porous preforms fabricated by the conventional VAD process became transparent, but the large preform fabricated by the above-described high-rate synthesizing process did not become transparent or remained a little white color. Therefore, it becomes clear that the large preforms fabricated by the high-rate synthesizing process cannot be made transparent. The porous preforms fabricated by the conventional VAD process and the preforms fabricated by the high-rate synthesizing process are different in (1) that the diameter of the fine particles of the former is less than 0.1 μm while the diameter of the fine particles of the latter is of the order of 0.2 μm, (2) that the bulk density of the former is about 0.23 g/cm$^3$ while the bulk density of the latter is about 0.39 g/cm$^3$ and (3) that the size of the former is about 60 mm in diameter while the size of the latter is about 130 mm in diameter. It is, therefore, considered that the porous preforms fabricated by the high-rate synthesizing process must be consolidated into a transparent body under some special conditions.

FIG. 4 shows a conventional apparatus for fabricating optical fiber preforms. Reference numeral 101 denotes a seed rod made of quartz glass; 102, a consolidated preform; 103, a porous preform; 104, a muffle made of quartz glass; 105, an electric furnace for consolidation; 106, a reaction vessel made of Pyrex glass; 107, a burner made of quartz glass; 108, a glass material supply system; 109, a gas seal; and 110, a pressure gauge for measuring a pressure inside the electric furnace 105. The muffle 104 has flanges at positions indicated by A and B so that the gas-tightness can be maintained.

When the porous preform 103 has a diameter of the order of 60 mm, the electric furnace 105 must be generally heated to 1500° C. in the consolidation step. Furthermore, in order to dehydrate the porous preform 103, a chlorine series dehydrating agent such as thionyl chloride, chlorine gas or the like must be used. As a result, in view of sealability and fabrication capability, there is no way but to use the muffle 104 made of quartz glass. However, a temperature at which the muffle 104 can be used without being softened is up to 1300° C. When the muffle 104 is used at 1500° C. without causing any deformation, an inner pressure in the inside of the electric furnace 105 must be monitored by means of the pressure gauge 110. An optimum value of the inner pressure varies in response to the pressure in the muffle 104 and it is difficult to control such an optimum value. Moreover, the muffle 104 is often used at a temperature higher than a maximum allowable temperature, it is likely to become opaque and cracks propagate in it. As a result, the muffle 104 is soon used up.

When the diameter of a porous preform is increased, the thermal absorption of the porous preform is increased and the inner diameter of the electric furnace is enlarged, so that thermal losses are increased and the load density of a heater becomes high. In the case of an electric furnace in the form of a tube or pipe, it is difficult to change an area of the heat radiating surface over a wide range, so that the surface temperature of the heater is increased with the increase in load density. For instance, when a carbon resistance furnace with an inner diameter of 150 mm is used and a muffle made of quartz glass is inserted in the furnace in order to consolidate a porous preform having an outer diameter of 130 mm, the temperature of a heat source must be raised at a rate of 3° C./min to 1550° C.

Therefore, in the case of an electric furnace which has a suitable inner diameter and is capable of increasing the temperature to a point at which transparent glass can be obtained, energy losses are high and a temperature of a heat source must be set at a high temperature. As a result, the power consumption of the electric furnace is high and the electric furnace must be made large in size. Furthermore, there is a problem that it is difficult to provide such an electric furnace simultaneously with a porous preform fabrication apparatus.

SUMMARY OF THE INVENTION

A first object of the present invention is, therefore, to provide a process for fabricating optical fiber preforms which fabricates large-sized porous preforms at a higher rate with a higher degree of reproducibility.

A second object of the present invention is to provide a process for fabricating optical fiber preforms in which the concentration distribution of a dopant which is added in order to control the refractive index profile is controlled with a higher degree of reproducibility when porous preforms are synthesized with the use of a multi-flame burner so that large-sized porous preforms can be fabricated at a high rate in a stable manner with a higher degree of reproducibility.

A third object of the present invention is to provide a process for fabricating optical fiber preforms, in which large-sized porous preforms fabricated by a high-rate synthesizing process are consolidated into a transparent glass body in a stable manner without causing the formation of fine pores.

A fourth object of the present invention is to provide a process for fabricating optical fiber preforms, wherein the consumption of a furnace muffle made of quartz glass is reduced to a minimum and the adjustment of the pressures in an electric furnace and in the furnace muffle is eliminated so that the fabrication process is simplified and the cost of the optical fiber preforms and hence the cost of optical fibers is reduced.

A fifth object of the present invention is to provide an apparatus for fabricating optical fiber preforms which accomplishes the all synthesis of large-sized optical fiber preforms in a simple and stable manner so that a cladding is formed in a very efficient manner.

A sixth object of the present invention is to provide an apparatus for fabricating optical fiber preforms in which a plurality of burners used for synthesizing porous preforms includes at least one multi-flame burner so that the whole or a substantial part of optical fiber preforms having various structures is synthesized in an efficient manner.

A seventh object of the present invention is to provide a burner for fabricating optical fiber preforms which preferably performs the fabrication method of the present invention.

In order to achieve the above objects, in the first aspect of the present invention, an optical fiber preform fabrication method comprises the steps of:

using a burner having a raw material supply orifice for supplying a glass raw material and a plurality of flame forming orifices disposed around the raw material supply orifice sequentially for forming a plurality of flames, respectively;

determining the flame speed $V_k$ of a kth flame, the flame speed $V_{k+1}$ of a (k+1)th flame surrounding outwardly of the kth flame and the flow speed Vm of the glass raw material in such a way that the following relations are satisfied:

$$0.1\ V_{k+1} \leqq V_k \leqq 2.5\ V_{k+1},$$

$$Vm \leqq V_{k+1}\ \text{and}$$

$$Vm \leqq V_k;$$

supplying the glass raw material to the multi-flame produced by the burner in which the kth flame is positioned rearwardly of the (k+1)th flame to synthesize fine glass particles;

depositing the fine glass particles on a seed rod to form a porous preform; and consolidating the porous preform into a transparent optical fiber preform.

In the second aspect of the present invention, an optical fiber preform fabrication method comprises the steps of:

using a burner having a raw material supply orifice for supplying a glass raw material and a plurality of flame forming orifices disposed around the raw material supply orifice sequentially for forming a plurality of flames, respectively;

positioning a kth flame rearwardly of a (k+1)th flame surrounding outwardly of the kth flame in such a way that the downstream end of the kth flame is substantially continuous to the upstream end of the (k+1)th flame;

supplying the glass raw material to the multi-flame produced by the burner to synthesize fine glass particles;

depositing the fine glass particles on a seed rod to form a porous preform; and consolidating the porous preform into a transparent optical fiber preform.

In the third aspect of the present invention, an optical fiber preform fabrication method comprises the steps of:

using a burner having a raw material supply orifice for supplying a glass raw material and a plurality of flame forming orifices disposed around the raw material supply orifice sequentially for forming a plurality of flames, respectively;

determining the flame speed $V_k$ of a kth flame, the flame speed $V_{k+1}$ of a (k+1)th flame surrounding outwardly of the kth flame and the flow speed Vm of the glass raw material in such a way that the following relations are satisfied:

$$0.1\ V_{k+1} \leqq V_k \leqq 2.5\ V_{k+1},$$

$$Vm \leqq V_{k+1}\ \text{and}$$

$$Vm \leqq V_k;$$

positioning the kth flame rearwardly of the (k+1)th flame surrounding outwardly of the kth flame in such a way that the downstream end of the kth flame is substantially continuous to the upstream end of the (k+1)th flame; and supplying the glass raw material to the multi-flame produced by the burner to synthesize fine glass particles;

depositing the fine glass particles on a seed rod to form a porous preform; and consolidating the porous preform into a transparent optical fiber preform.

Here, it is preferable that the following relation is satisfied:

$$V_{k+1} = V_k \geqq Vm.$$

Here, a ratio between the flow rates of combustible gases supplied to the plurality of flame forming orifices of the burner and an overall flow rate of the combustible gases supplied to the plurality of flame forming orifices can be controlled in accordance with a predetermined concentration distribution of an additive.

In the fourth aspect of the present invention, an optical fiber preform fabrication method comprises the steps of:

decomposing a glass raw material in a flame so that fine glass particles are produced;

depositing the fine glass particles on a seed rod to form a porous preform;

heating the porous preform at a temperature increase rate of 5° C./min or less; and consolidating the porous preform into a transparent optical fiber preform.

In the fifth aspect of the present invention, an optical fiber preform fabrication method comprises the steps of:

decomposing a glass raw material in a flame so that fine glass particles are produced;

depositing the fine glass particles on a seed rod to form a porous preform;

heating the porous preform at a temperature which is lower than the consolidation temperature of the porous preform and at which the porous preform is shrunk; and heating again the shrunk preform at the consolidation temperature to consolidate the porous preform into a transparent optical fiber preform.

Here, the heating of the shrunk preform at the consolidation temperature can be is effected in a second furnace different from a first furnace in which the porous preform is heated at the temperature lower than the consolidation temperature. The porous preform can be first heated at the temperature lower than the consolidation temperature in a quartz furnace muffle and then the shrunk preform can be heated at the consolidation temperature in a carbon furnace muffle.

In the sixth aspect of the present invention, an optical fiber preform fabrication apparatus comprises:

a plurality of raw material synthesizing burners;

means for supplying a combustible gas, an auxiliary gas and a glass raw material to the plurality of raw material synthesizing burners; and at least one of the plurality of raw material synthesizing burners being a multi-flame burner including a raw material supply orifice through which the glass raw material is supplied, and a plurality of flame forming orifices disposed around the raw material supply orifice sequentially for forming a plurality of flames, respectively and one of the plurality of flame forming orifices being adjustably positioned rearwardly of the outer flame forming orifice surrounding outwardly of the one flame forming orifice;

whereby the glass raw material is decomposed in the flame produced by the combustible gas and the auxiliary gas so that fine glass particles are produced and the fine glass particles thus produced are deposited on a seed rod to form a porous preform.

Here, the multi-flame burner may form a porous preform for forming a cladding region of an optical fiber.

The plurality of raw material synthesizing burners other than the multi-flame burner may include a burner for synthesizing a porous preform for forming a core region of an optical fiber.

The burner for synthesizing the core region of the porous preform can be a multi-flame burner comprising a raw material supply orifice through which the glass raw material is supplied, and a plurality of flame forming orifices disposed around the raw material supply orifice sequentially for forming a plurality of flames, respectively, of which one of the plurality of flame forming orifices is adjustably positioned rearwardly of the outer flame forming orifice surrounding outwardly of the one flame forming orifice, and the burner for synthesizing the core region of a porous preform can be smaller in diameter than the multi-flame burner for synthesizing the cladding region of the porous preform.

The burner for synthesizing the core region of the porous preform may have a raw material supply orifice which is disposed eccentrically with respect to the axis of the burner to synthesize the core region and a flame forming orifice disposed around the raw material supply orifice to form a flame.

The burner for synthesizing the cladding region of the porous preform can be a multi-flame burner comprising a raw material supply orifice through which the glass raw material is supplied, and a plurality of flame forming orifices disposed around the raw material supply orifice sequentially for forming a plurality of flames, respectively, of which one of the plurality of flame forming orifices is adjustably positioned rearwardly of the outer flame forming orifice surrounding outwardly of the one flame forming orifice, and the burner for synthesizing the core region of the porous preform can have a raw material supply orifice which is disposed eccentrically with respect to the axis of the burner to synthesize the core region and a flame forming orifice disposed around the raw material supply orifice to form a flame.

The plurality of raw material synthesizing burners may include a burner for synthesizing a core region and at least one burner for synthesizing a cladding region and that the burner for synthesizing the core region can be inclined at an angle within a range of 20°–65° and the at least one burner for synthesizing the cladding region can be inclined at an angle within a range of 45°–90°.

In the seventh aspect of the present invention, an optical fiber preform fabrication burner for decomposing a glass raw material in a flame to synthesize fine glass particles, comprises:

a raw material supply orifice for supplying the glass raw material;

a plurality of flame forming orifices disposed around the raw material supply orifice sequentially for forming a plurality of flames;

an outer raw material supply orifice interposed between the plurality of flame forming orifices for supplying the glass material;

the tip of one of the plurality of flame forming orifices being located on the upstream side of the outer flame forming orifice surrounding outwardly of the one flame forming orifice;

each of the plurality of flame forming orifices including a combustible gas supply orifice and an auxiliary gas supply orifice; and the tips of the raw material supply orifice and the outer raw material supply orifice being located on the upstream side of the tips of the combustible gas supply orifice and the auxiliary gas supply orifice of each of the plurality of flame forming orifices.

Here, each of the tips of the orifices of the burner may have a cross sectional configuration corresponding to a single bit edge.

The distance between the tip of the one flame forming orifice and the tip of the outer flame forming orifice can be adjustable.

The above and other objects, effects, features and advantages of the present invention will become more apparent from the following description of preferred embodiments thereof taken in conjunction with the accompanying drawings.

Figure 5:
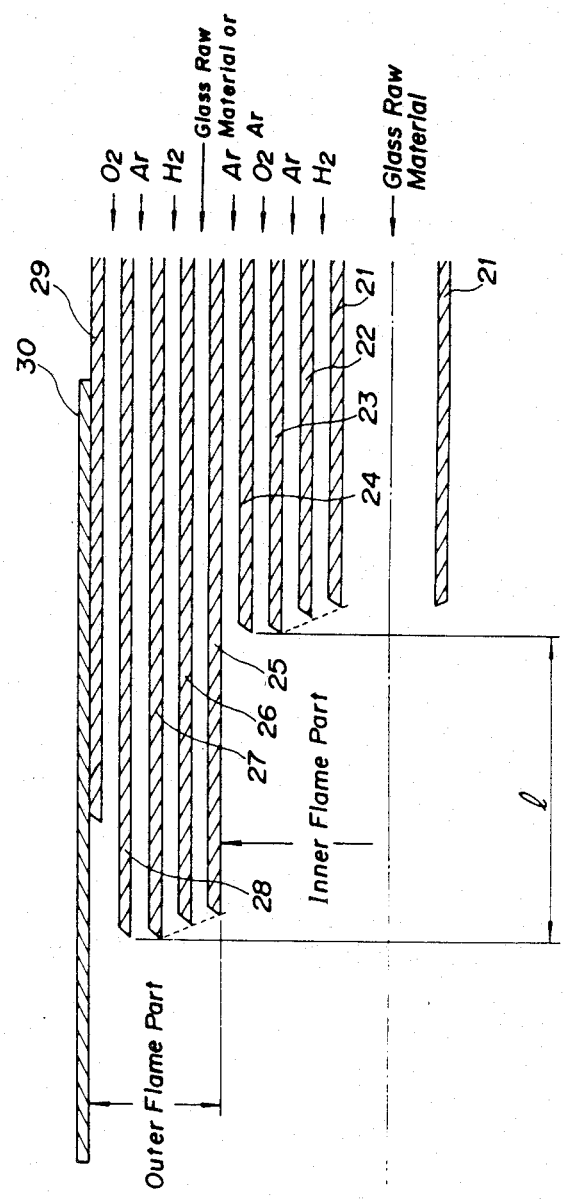
FIG. 5 is a sectional view showing an embodiment of a double-flame burner according to the present invention.

DETAILED DESCRIPTION OF THE PREFERRED EMBODIMENTS (1) Burner and Flow Rate Control:

FIG. 5 shows an embodiment of a multi-flame burner for synthesizing fine glass particles. This embodiment shows a double flame burner. Here, reference numeral 21 denotes a glass material supply orifice; 22 a combustible gas supply orifice for discharging a hydrogen gas and a hydrocarbon fuel such as methane, propane or butane; 23, an inert gas supply orifice for discharging Ar, He or N$_2$; 24, a auxiliary gas supply orifice for discharging O$_2$; and 25 another inert gas supply orifice. These orifices 21–25 are concentrically disposed in the order of these reference numerals and constitute an inner multiple orifice assembly for forming an inner flame. The combustible gas is burned with the aid of the auxiliary gas to produce the inner flame. Reference numeral 26 denotes an inert gas supply orifice; 27, a combustible gas supply orifice; 28, another inert gas supply orifice; and 29, an auxiliary gas supply orifice. These orifices 26–29 are concentrically disposed around the orifice 25 in the order of these reference numerals and constitute an outer multiple orifice assembly for forming an outer flame. The combustible gas is burned with the aid of the auxiliary gas to produce the outer flame. The inner multiple orifice assembly is spaced rearwardly of the outer multiple orifice assembly by a distance 1. The outer multiple orifice assembly is surrounded by a hood 30.

The inner and outer glass material supply orifices 21 and 26 are so disposed that their orifice tips are located on the upstream side in the gas stream with respect to the combustible gas supply orifices and the auxiliary gas supply orifices disposed radially outwardly of the glass material supply orifices 21 and 26. As a result, the fine glass particles produced by the decomposition in the flames of the glass material supplied in the form of chloride are prevented from adhering to the tips of the glass material supply orifices 21 and 26. In other words, when the fine glass particles adhere to the orifice tips, the synthesizing conditions vary as the lapse of time.

Figure 8:
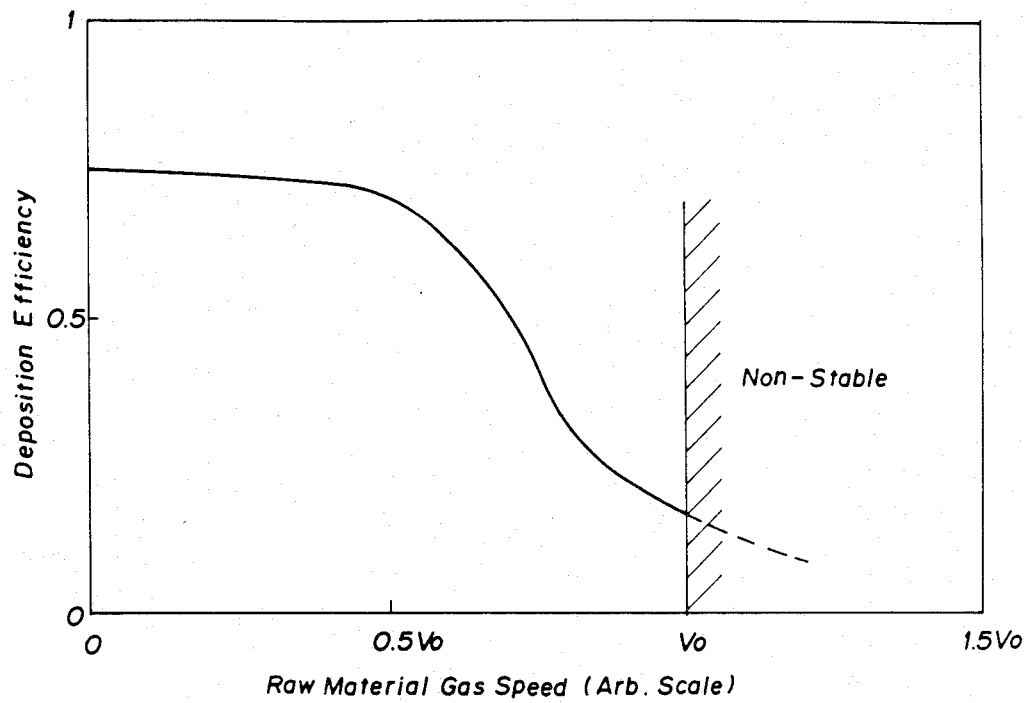
FIG. 8 illustrates characteristic curve representing a dependency of a deposition efficiency of fine glass particles upon a flow speed of the glass raw material layer.

It is preferable that each orifice tip is cut in the form of a single bit edge as shown in FIG. 8. The reason is that when use is made of an orifice which has an orifice tip cut perpendicular to the axis of the orifice and which is made of a thick material, the gas flow is disturbed at the orifice tip, so that there arises the problem that the fine glass particles adhere to the orifice tip. It is to be understood that the burner characteristics almost remain unchanged, even when the positions of the combustible gas supply orifice, the auxiliary gas supply orifices and the inert gas supply orifices are exchanged from one to another.

In the present invention, porous preforms are fabricated by supplying a glass material into multi-flame by using the multi-flame burner shown in FIG. 5 and by determining the velocities of these flames so as to satisfy the relations to be described below. Furthermore, the glass raw material is supplied at a flow rate equal to or less than the flame velocities.

Figure 6:
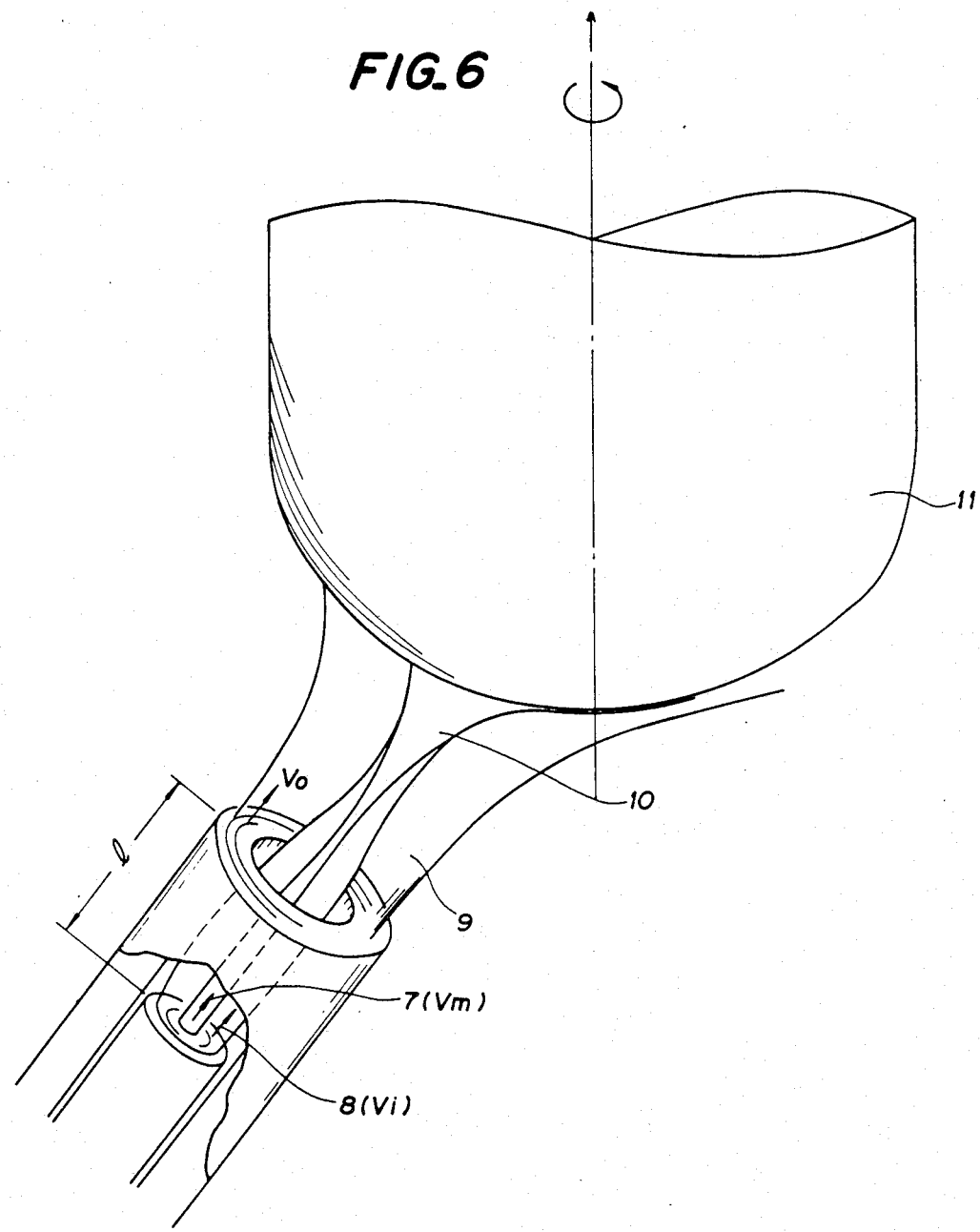
FIG. 6 is a schematic view used to explain flow speeds at various points and the distance between the inner orifice and the outer orifice in a double-flame burner according to the present invention.

The inventors conducted the experiments in order to clarify the relationship between the velocities of combustible gas flows and the stable growth of porous preforms. Use was made of a double-flame burner having multiple flame orifices arranged concentrically as shown in FIG. 5. As shown in FIG. 6, the distance l was set at 60 mm and the relationship among the speed Vo of the outer flame stream, the speed Vi of the inner flame stream and the speed Vm of the glass raw material flow was studied.

When the outer flame speed Vo is determined, the Reynolds number of the outer flame is taken into consideration. In this manner, the outer flame speed Vo was set at 2 m/sec, so that the outer flame be maintained in stable state. In this specification, flame speed is defined by dividing flow rates of oxygen and hydrogen gases, which dominantly contribute to the formation of a flame, by cross sectional areas of the orifices through which the oxygen and hydrogen gases are ejected.

The multi-flame burner was positioned at a position that a usual single flame burner is positioned for the fabrication of optical fiber preform. Further, a quasi-preform was used as the depositing target in the experiments, so that a deposition rate of fine glass particles has a dependency of the quasi-preform. With this in view, the deposition rate is indicated by arbitrary scale.

SiCl$_4$ was supplied as a glass raw material at a rate of 2300 cc/min to the central region of the inner flame by an Ar gas as carrier gas. A deposition rate of fine glass particles was measured by varying the inner flame speed Vi. The inner flame speed Vi was varied by varying flow rates of the oxygen and hydrogen gases at the same ratio.

Figure 7:
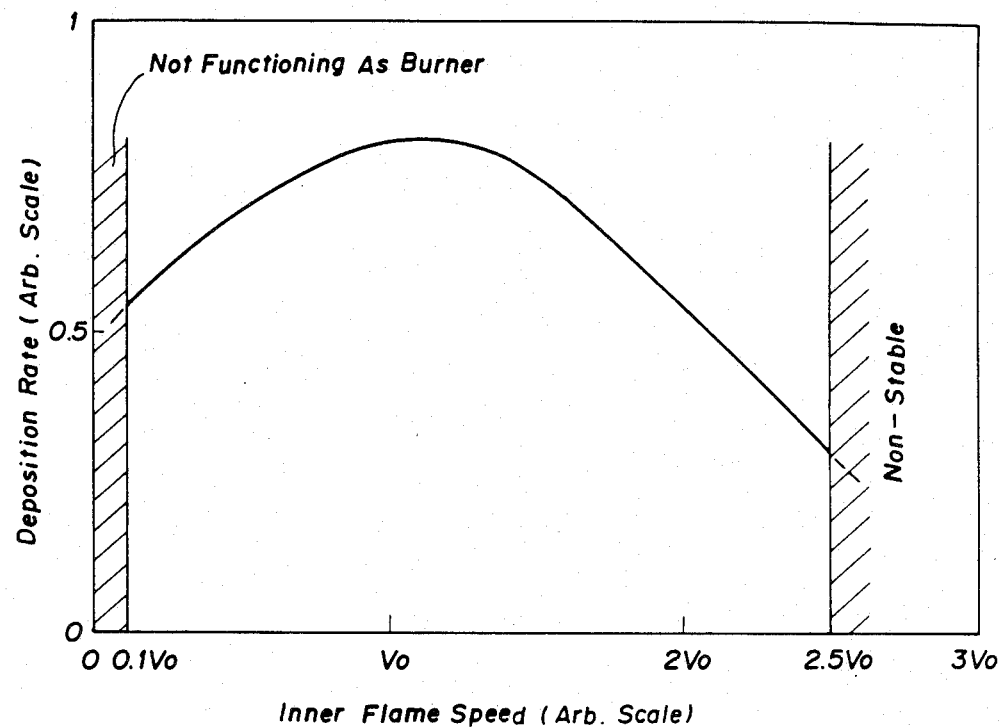
FIG. 7 illustrates characteristic curve representing a dependency of a deposition rate of fine glass particles upon a flow speed of the inner flame.

The experimental result is shown in FIG. 7. When the inner flame speed Vi was increased, the double flame effect became remarkable and the deposition rate of fine glass particles was increased and reached the maximum value when Vi≃Vo=2 m/sec. However, when the inner flame speed Vi was further increased, the inner flame disturbed the outer flame, so that the inner and outer flames could not be maintained in stable state. As the result, the surface temperature of the preform was not uniform and the deposition rate of fine glass particles was decreased. Especially, when the inner flame speed Vi was increased substantially beyond 2.5 Vo=5 m/sec, a stable growing surface could not be obtained. On the other hand, when the inner flame speed Vi was decreased to a value substantially equal to or less than 0.1 Vo=0.2 m/sec, the burner failed to attain a satisfactory function as burner, so that a stable growing surface could not be obtained.

FIG. 8 shows the relationship between a flow rate of the glass raw material and a deposition efficiency of fine glass particles estimated by measuring a weight of the deposited fine glass particles when a speed Vm of the glass raw material supplied to the inner flame was varied by controlling the flow rate of a carrier gas.

From FIG. 8, it is seen that the deposition rate is rapidly decreased when the speed Vm of the glass raw material layer is increased substantially beyond 0.5 Vo=1 m/sec. When the speed Vm exceeded substantially Vo=2 m/sec, the reaction between the glass raw material and the flame almost did not proceed and the stable growth could not be obtained. It is, therefore, preferable that Vm≦Vo.

In view of the above, in order to ensure the stable growth of preforms at a high fabrication rate, it is preferable that the inner flame speed Vi is in the range defined by 0.1 Vo≦Vi≦2.5 Vo and Vm≦Vo. More preferably, Vo=Vi≧Vm.

Figure 9:
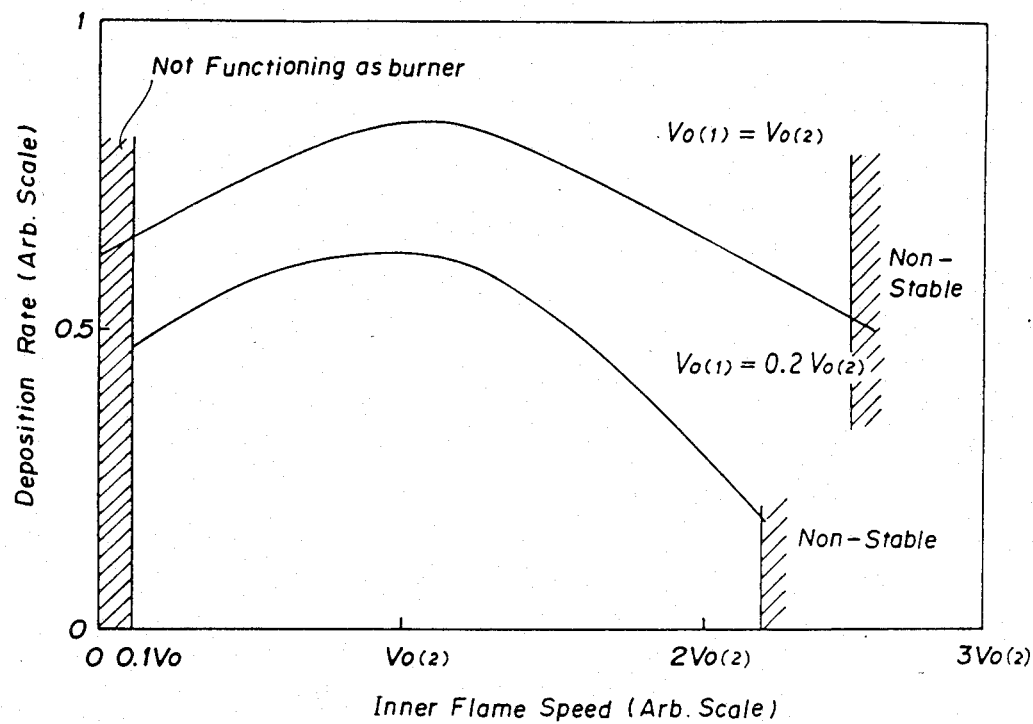
FIG. 9 illustrates characteristic curves representing a dependency of a deposition rate of fine glass particles upon a flow speed of the inner flame.

Similar experiments were conducted in case of a triple-flame burner having one additional flame surrounding the double-flame. FIG. 9 illustrates the relationship between a gas speed Vi of the first or the innermost flame and a gas speed Vo(2) of the third or the outermost flame. Here, it is assumed that the second flame has a gas speed of Vo(1). FIG. 9 illustrates two cases of Vo(1)=Vo(2) and Vo(1)=0.2 Vo(2).

In such a triple-flame burner, it is seen that there is a similar relatioship. When the gas speeds Vo(1) and Vo(2) are different like the case of Vo(1)=0.2 Vo(2), a range in which a stable growth is observed is narrowed and there is a tendency that the deposition rate of a fine glass particles is decreased as a whole.

As a result, it is seen that the present invention is applicable not only to the double-flame or the triple-flame, but also to a multi-flame in general. When it is assumed that a gas speed of a kth flame is $V_k$ and a gas speed of a (k+1)th flame is $V_{k+1}$, a porous preform can grow at a high fabrication rate in a stable manner with a good reproducibility under a condition of:

$$0.1\ V_{k+1} \leq V_k \leq 2.5\ V_{k+1}$$

$$V_m \leq V_{k+1}$$

$$V_m \leq V_k.$$

While in the above-described experiments, the relationship among Vi, Vm and Vo was investigated when the outer flame speed Vo was set at 2 m/sec, it was confirmed that the above-described relationships can be held even when the outer flame speed Vo is set at a value other than 2 m/sec, as far as the flame streams are not disturbed in the vicinity of the growing portion of the porous preform. The speed Vo can be varied depending upon a diameter and a shape of the porous preform to be fabricated and can be determined in the range of 0.5–5 m/sec. If the speed Vo is determined in this range, the relationships similar to the above were obtained.

The inner or outer flame speed can be controlled by adjusting a burner dimensions distances between the orifices and at least one of the flow rates of oxygen and hydrogen gases.

Figure 10:
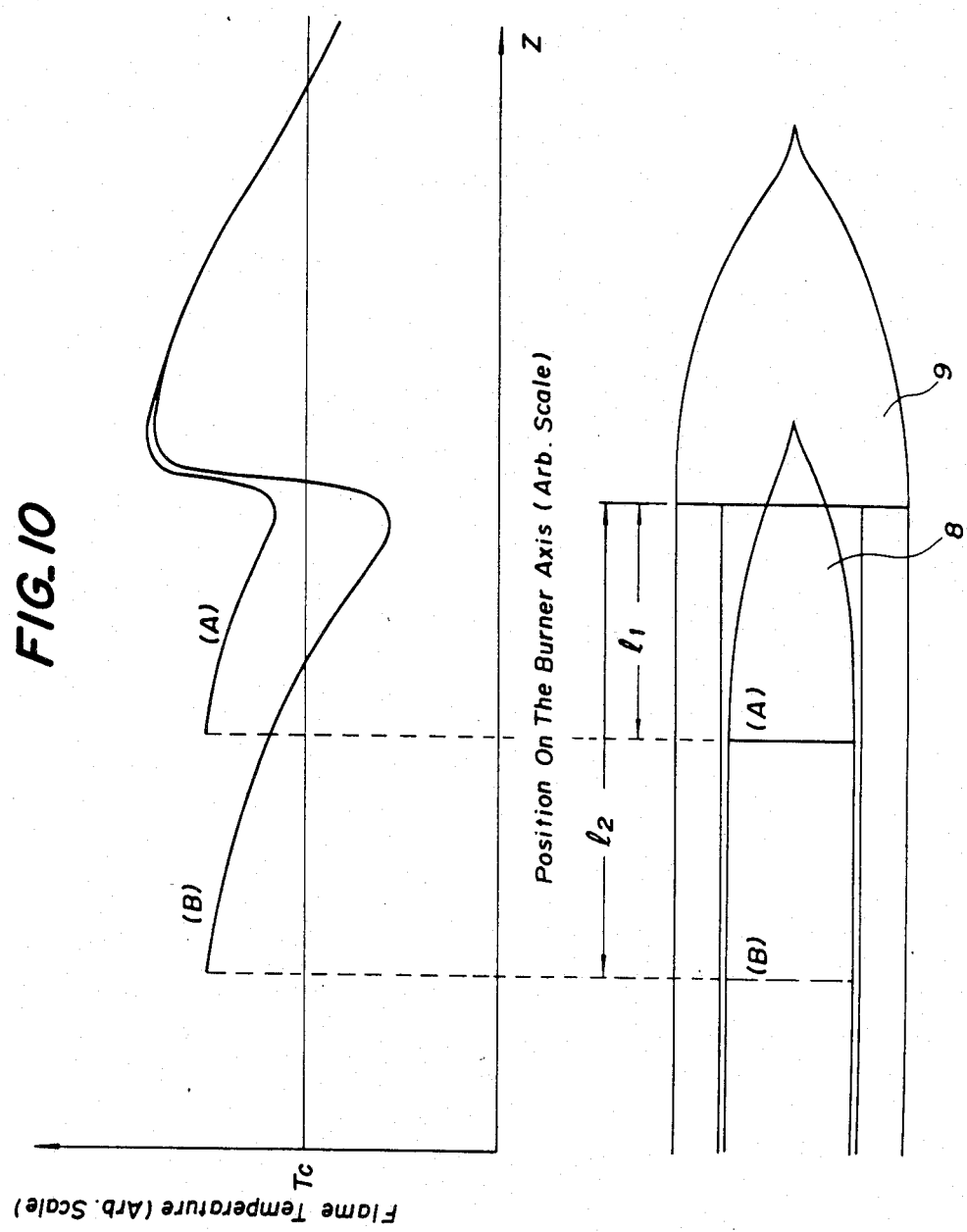
FIG. 10 illustrates a flame temperature distribution representing the relationship between a distance between the inner flame and the outer flame in the axial direction of the double-flame burner and a flame temperature.

Referring next to FIG. 10, explanation will be made of the manner of determining the distance l between the inner flame and the outer flame under a condition that the outer and inner flame speeds and the speed of the glass raw material layer are selected to satisfy the above described relations. FIG. 10 illustrates a flame temperature distribution in the axis of the burner together with the locations of the inner and outer flames. Here, Tc represents a lower critical reaction temperature and the reaction of a glass material does not occur at a temperature less than the lower critical reaction temperature Tc.

In the state (A) in which the distance l as shown in FIG. 10 is $l_1$, the downstream end of the inner flame 8 is substantially continuous to the upstream end of the outer flame 9 and the flame temperature is continuous at temperatures higher than the lower critical temperature Tc. Here, "continuity" means a condition where a flame temperature is always higher than the lower critical temperature Tc. When the distance l is increased to $l_2$ in the state (B), the inner and outer flames 8 and 9 are separated from each other; i.e., the flames are not continuous. Therefore, the distance l is so determined that the inner flame 8 is substantially continuous to the outer flame 9 under the conditions that the outer and inner flame speeds Vo and Vi and the speed Vm of the glass material layer are selected so as to satisfy the above-described relations. If the distance l is increased as long as possible within a range thus determined so that the flame length is extended, and consequently the deposition rate of fine glass particles is improved.

Figure 11:
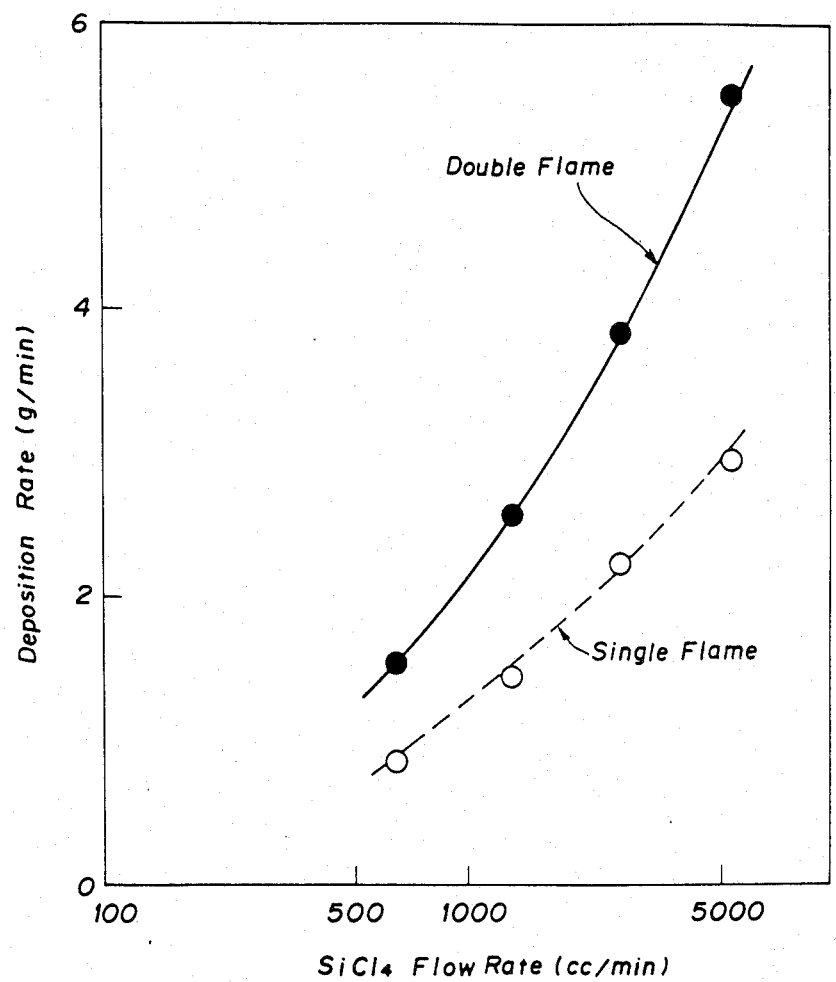
FIG. 11 illustrates the relationship between a flow rate of a glass raw material and a deposition rate of fine glass particles deposited in the cases of a single-flame process and a double-flame process.

FIG. 11 illustrates the relationship between a flow rate of $SiCl_4$ which is supplied as a glass raw material and a deposition rate of fine glass particles when a double flame fabrication process and a single flame fabrication process are comparatively employed, when $SiO_2$ is deposited on a quasi-preform having a diameter of 150 mm. The solid line curve shows the relationship when the double-flame fabrication process is employed, while the broken line curve shows the relationship when the single flame fabrication process is employed. FIG. 11 clearly shows that when $SiCl_4$ was supplied at a flow rate of 5000 cc/min, the deposition rate was 5 g/min and a yield was 60-70% in case of the double-flame fabrication process.

Next, EXAMPLES of the present invention will be described. Further, it is to be understood that the present invention is not limited to these EXAMPLES at all.

In the double-flame burner shown in FIG. 5, an outer diameter of the double-flame burner was 53 mm and the distance l was set at 60 mm. The double-flame burner is used in the fabrication of porous preforms by the process in accordance with the present invention.

EXAMPLE 1

EXAMPLE 1 relates to a fabrication of a porous preform consisting of $SiO_2$. As a multi-flame burner, the double-flame burner having a multiple flame orifice structure in which the orifices are arranged concentrically and used in the above-described gas speed experiments.

In the double-flame burner shown in FIG. 5, the outer and inner flame speeds Vo and Vi were set at 2.1 m/sec and 2.1 m/sec, respectively, while the speed Vm of the glass raw material layer was set at 0.7 m/sec. $SiCl_4$ carried by the argon gas was supplied at a flow rate of 2200 cc/min through the raw material supply orifice. A preform was synthesized at a synthesizing speed of 3.5 g/min and the yield was 65%. A preform was grown in a very stable manner and a large-sized porous preform having a diameter of 120 mm and an effective length of 800 mm was obtained after 10 hours. After long time fabrication processing like 10 hours, the shape of the growing surface did not vary and a stable growth was achieved.

EXAMPLE 2

EXAMPLE 2 relates to a fabrication method of porous preforms having a refractive index profile based upon the addition of $GeO_2$. In this case, it was necessary to lower a flame temperature to form noncrystalline $GeO_2$ in comparison with a case where $GeO_2$ is not added. In order to increase a synthesizing rate and to adjust a refractive index profile, the glass raw material was also supplied to the outer flame.

The double-flame burner as shown in FIG. 5 was used like in EXAMPLE 1 and the outer and inner flame speeds Vo and Vi were set at 2.0 m/sec, and the speed Vm of the glass raw material layer was set at 0.8 m/sec. Under the same conditions as described in EXAMPLE 1, $SiCl_4$ and $GeCl_4$ which were carried by the argon gas were supplied at a rate of 200 cc/min. The synthesizing rate was 4.5 g/min and the difference in refractive indexes was 1.1 %.

It is apparent from this EXAMPLE that the present invention is equally advantageously applied to the fabrication of glass preforms containing a dopant for controlling the refractive index profile.

It has been confirmed that when a glass raw material is also supplied to the outer flame, the deposition rate is increased, but the effect due to the extended passing time during which the fine glass particles produced in the outer flame passes only through the outer flame is not obtained, so that the yield; that is, the ratio between an amount of fine glass particles produced and a total amount of the glass material supply is more or less decreased. The yield was 55%. Such a reduction of the yield is resulted from the facts that the yield of $GeCl_4$ is relatively lower than the yield of $SiCl_4$ and that the yield of the glass raw material supplied to the outer flame is lower than the yield of the glass raw material supplied to the inner flame.

As described above, according to the present invention, multi-flame is used, in which the outer and inner flame speeds are determined at preferable values and the inner flame is spaced rearwardly of the outer flame. As a result, large-sized preforms are fabricated at a higher fabrication rate in a stable manner so that the preform manufacturability is improved and the cost of optical fibers is also reduced.

(2) Control on Refractive Index Distribution

According to the present invention, in order to control a refractive index profile, flow rates of and a ratio between combustible gases supplied to the orifices of a multi-flame burner to produce flames are controlled as will be described in detail in the following EXAMPLES 3 and 4.

EXAMPLE 3

In EXAMPLE 3, a large-sized porous preform for core having a large diameter was fabricated by adding $GeO_2$. A refractive index profile is controlled by adjusting the above factors in the multi-flame burner.

The double-flame burner with a plurality of concentric annular orifices of the type described above with reference to FIG. 5 was used as an example of a multi-flame burner. The diameter of the burner was 53 mm and the distance l was 60 mm. The flow rates of gases to be supplied to the burner and the ratios between these flow rates were varied in the fabrication of porous preforms.

Figure 12:
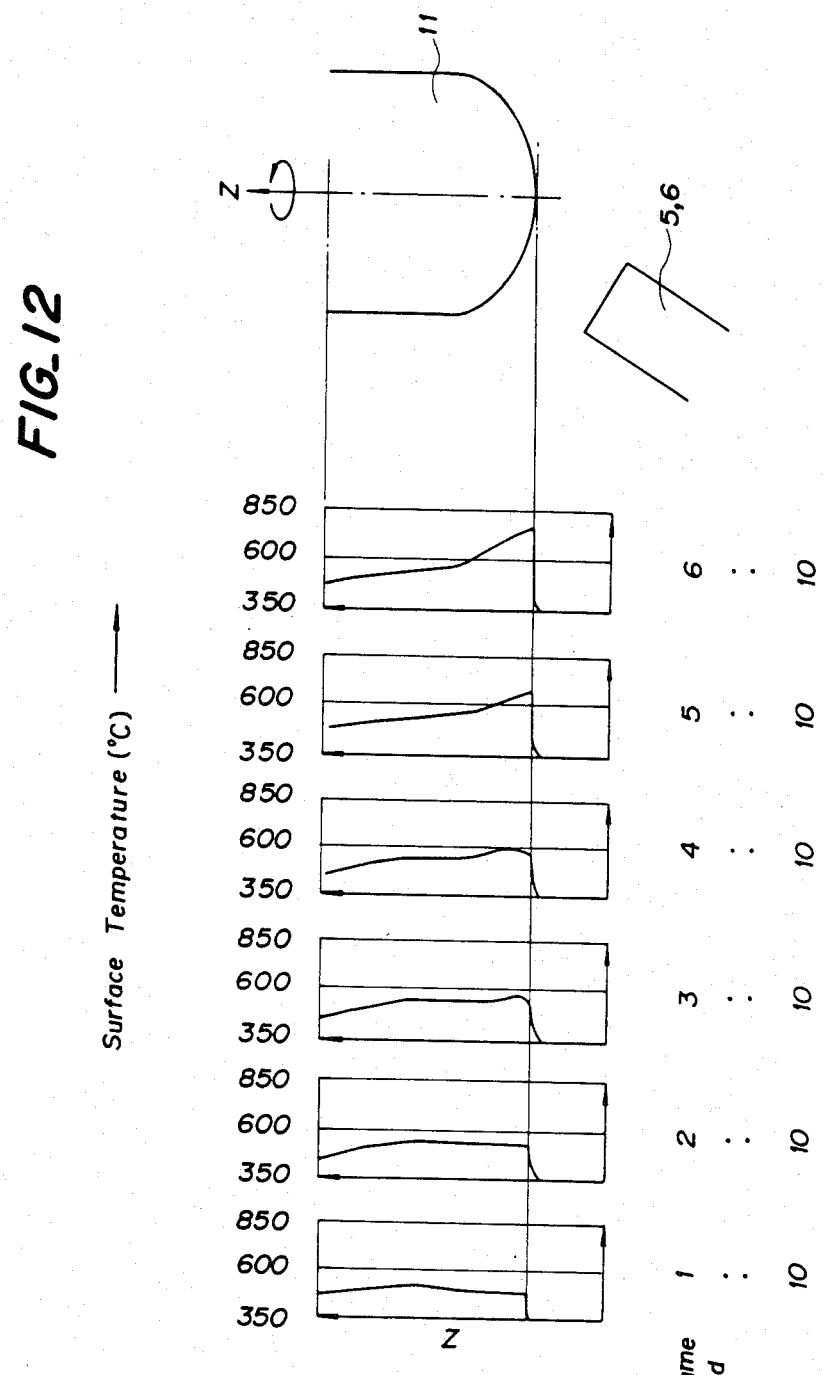
FIG. 12 shows a surface temperature distributions of the porous preforms when a ratio between flow rates of hydrogen gas supplied to the inner flame and hydrogen gas supplied to the outer flame is varied.

Hydrogen gas was used as the combustible gas. The flow rates of gases except hydrogen gas were maintained constant and the flow rate of hydrogen gas to be supplied to the outer flame was maintained at a predetermined value of 22 l/min while the flow rate of the hydrogen gas to be supplied to the inner flame was varied. FIG. 12 shows the temperature distributions of the porous preforms thus obtained by varying the hydrogen gas flow rate of the inner flame. The temperature distributions show the results when the temperature was measured by a radiation pyrometer in the direction of the axis of the porous preforms.

It is seen from FIG. 12 that the temperature distribution can be controlled by varying the ratio between the flow rates of the inner and outer hydrogen gases. When the flow rate of the hydrogen gas to be supplied to the inner flame is low, a flat temperature distribution is obtained in the central region. When the flow rate of the hydrogen gas to be supplied to the inner flame is increased, a steep temperature distribution is obtained. When the flow rate ratio of (the flow rate of the hydrogen gas to be supplied to the inner flame):(the flow rate of the hydrogen gas to be supplied to the outer flame) was 1:10, a stepped refractive index profile was obtained. When the above-described flow rate ratio was 5:10, a smooth temperature distribution having no inflection point was obtained and the preform fabricated under this condition was a graded index type preform having a substantially parabolic refractive index profile.

An optical fiber having an outer diameter of 125 μm, a core diameter of 50 μm and a difference in refractive indexes of 1% was drawn from the preform thus obtained and the transmission bandwidth of this optical fiber was investigated. In the case of the optical fiber drawn from the preform fabricated with the hydrogen gas flow rate ratio of 1:10, its transmission bandwidth was 40 MHz.km (at a wavelength of 1.3 μm). In the case of the optical fiber drawn from the preform fabricated with the hydrogen gas flow rate ratio of 5:10, its transmission bandwidth was 800 MHz·km (at a wavelength of 1.3 μm).

Figure 1:
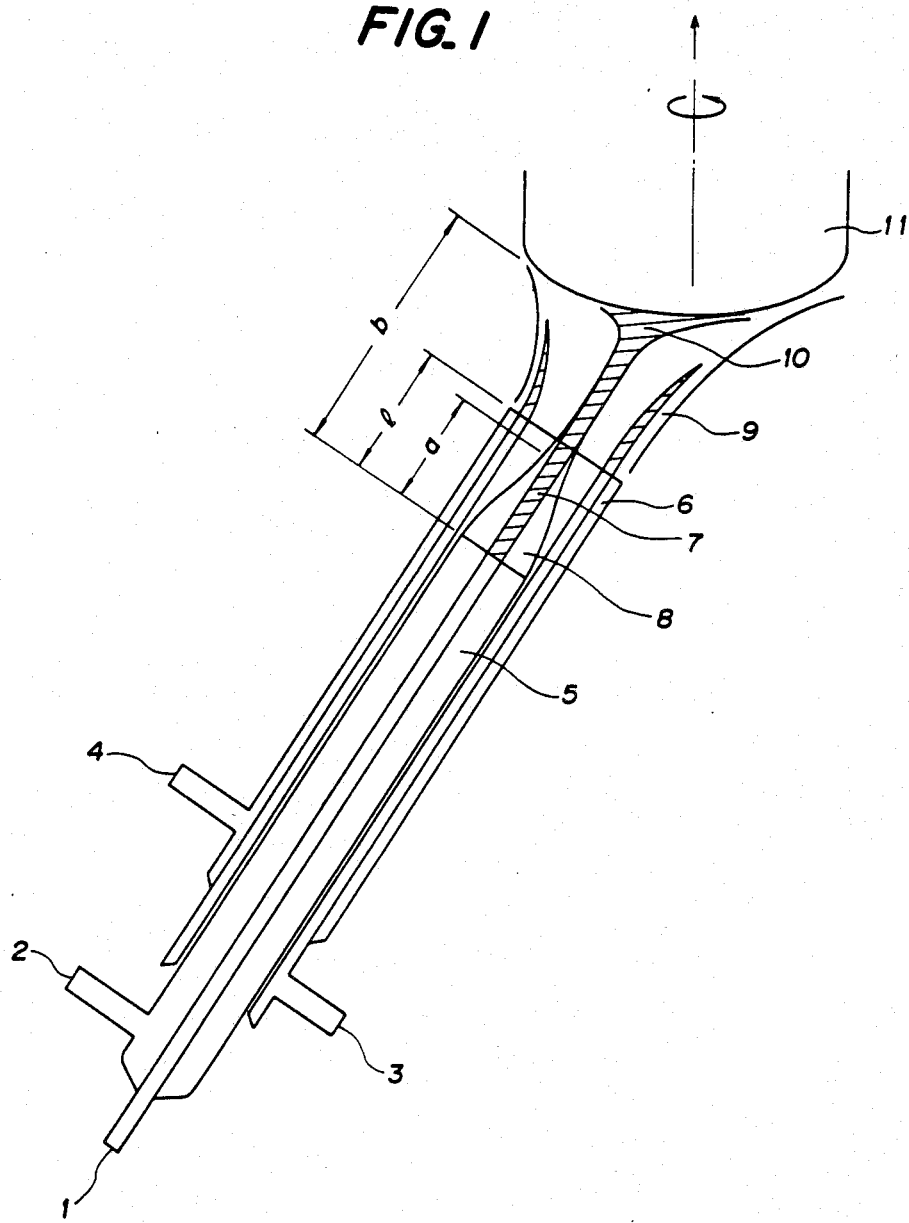
FIG. 1 is a schematic view showing a multi-flame burner for forming a plurality of flames.
Figure 2:
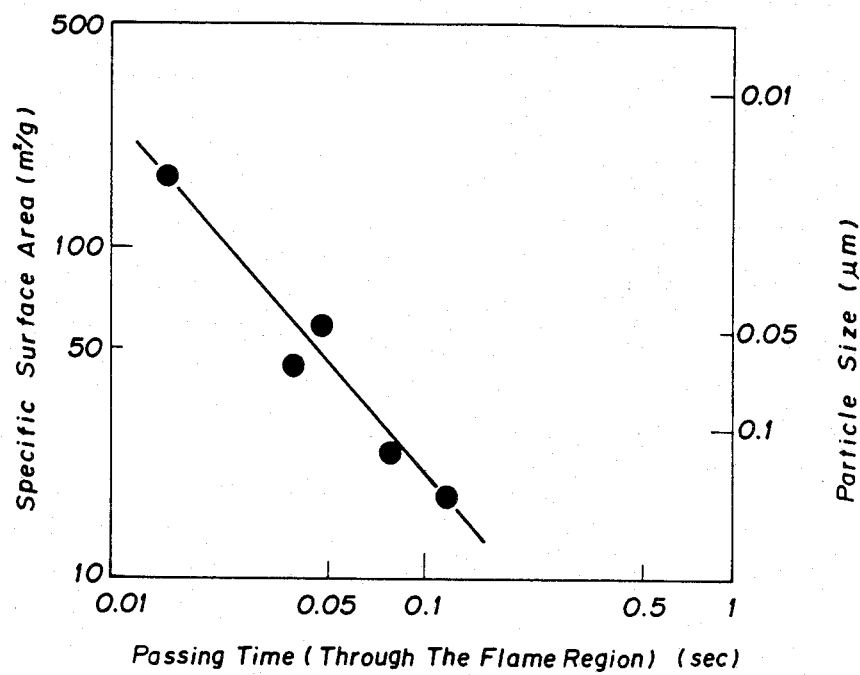
FIG. 2 illustrates the relationship between a size or a specific surface area of fine glass particles and a passing time period during which the fine glass particles passes through the flame region.
Figure 3:
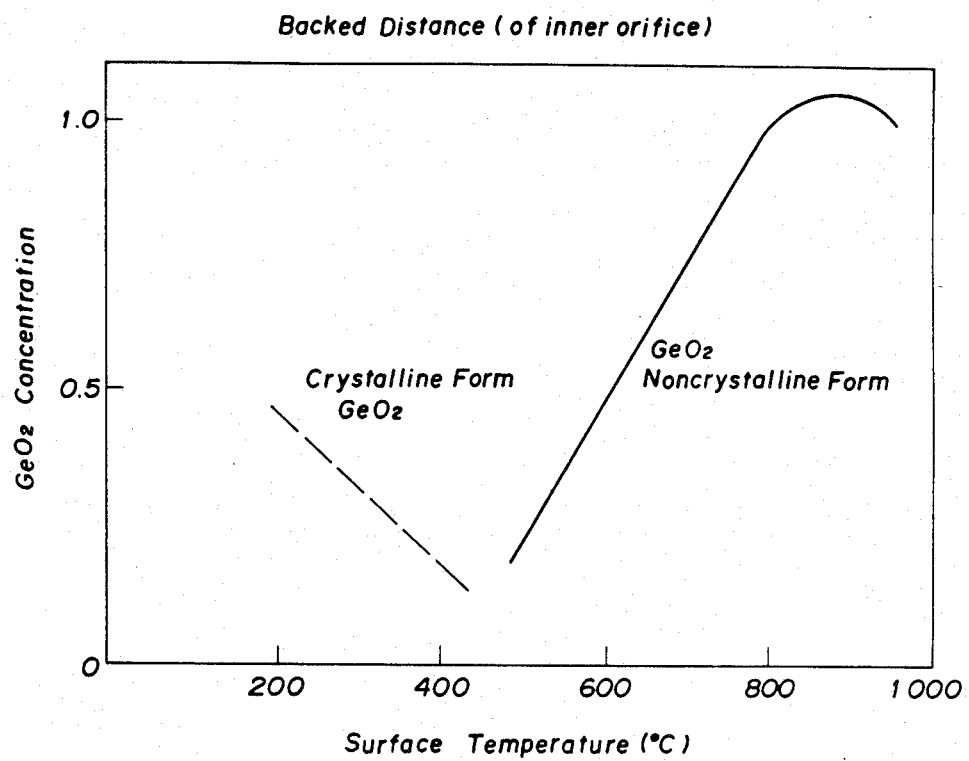
FIG. 3 illustrates characteristic curves representing a surface temperature dependency of a concentration of GeO$_2$ added as a dopant for controlling a refractive index profile.
Figure 4:
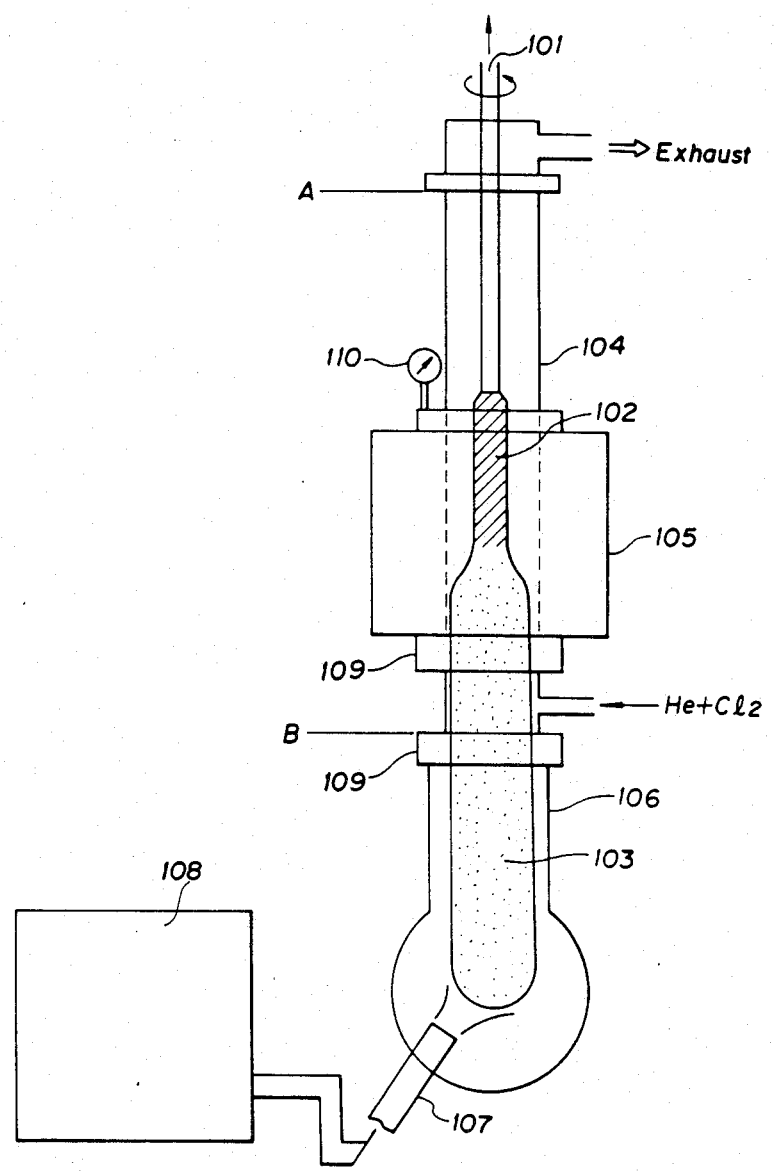
FIG. 4 is a schematic view showing a conventional apparatus for fabricating optical fiber preforms.

As described with reference to FIG. 3, in order that a surface temperature distribution corresponds to a $GeO_2$ concentration distribution with a high degree of accuracy, it is necessary that the surface temperature is maintained within a predetermined range.

In this EXAMPLE, the surface temperature was controlled by varying the total flow rate of the hydrogen gas while maintaining the ratio between the flow rates of the hydrogen gas at a predetermined value, so that the surface temperature of the leading end was maintained at about 700° C.

The porous preform thus obtained had a large diameter of about 130 mm. Considering the large size of the porous preform thus obtained, the porous preform was first shrunk at 1300° C. in the consolidation step (in which dehydration with a chlorine-series dehydrating agent was simultaneously carried out). Thereafter, the shrunk porous preform was consolidated at about 1550° C. Therefore, the consolidation process employed in EXAMPLE 3 had two steps. In this manner, a transparent glass preform with high optical qualities was obtained. The above-described characteristics was obtained when an optical fiber was drawn from the jacketed preform after the transparent preform was elongated and inserted into a jacket quartz tube.

EXAMPLE 4

EXAMPLE 4 relates to a control method of a refractive index profile when a core portion of an all-synthesized preform of graded type is fabricated by a multi-flame burner. In order to adjust a core diameter/cladding diameter ratio, it is necessary to form a porous preform having a diameter of 50-60 mm, instead of the preform in EXAMPLES 3 having a large diameter. While the porous preform having a diameter of 50-60 mm can be fabricated by a conventional single-flame burner, a pulling up speed; i.e., a growing speed in the axial direction of the porous preform and a synthesizing speed can be increased by the multi-flame burner.

Figure 13:
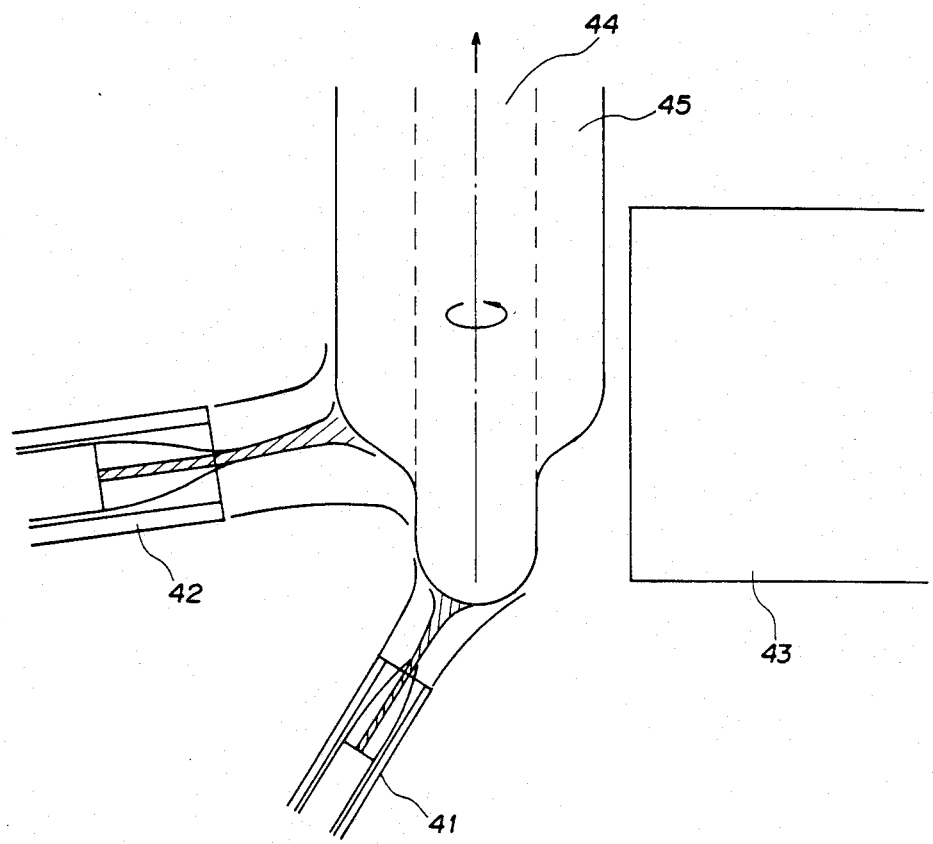
FIG. 13 is a schematic view showing the fabrication of a preform by a all-synthesizing process.

As shown in FIG. 13, an all-synthesized, graded-index type preform was fabricated by using a double-flame burner 41 which was substantially similar in construction to that shown in FIG. 5 and had a small diameter of 30 mm for synthesizing a core and a double flame burner 42 for synthesizing a cladding which was substantially similar in construction to that shown in FIG. 5 and had a diameter of 53 mm. The burner 41 was inclined at an angle within a range of 20°-65° relative to the vertical direction, for example 30°. The burner 42 is inclined at an angle within a range of 45°-90° relative to the vertical direction, for example 70°. The inclination of the burner 41 is determined in a manner that the glass raw material flow is stabilized and the inclination of the burner 42 is determined in a manner that the boundary surface between the core and the cladding does not have salient inflections of the shapes and sudden changes of the densities relative to the radial direction as shown in FIG. 13. Reference numeral 43 denotes an exhaust port. Reference numerals 44 and 45 denote the core and the cladding of the preform obtained, respectively.

$SiCl_4$ and $GeCl_4$ were supplied as glass materials at a flow rate of 450 cc/min and at a flow rate of 40 cc/min, respectively, to the double-flame burner 41 for synthesizing a core. The diameter of the core 44 of the porous preform was as small as 55 mm and the pulling up speed was 1.6 times as high as that in case of a conventional single flame burner. As a result, in order to control the cladding diameter/core diameter ratio, $SiCl_4$ must be supplied at a flow rate of 2500 cc/min to the double-flame burner 42 for synthesizing a cladding. The porous preform thus obtained had an outer diameter of 140 mm. As a result, the pulling up speed (that is, the growth rate in the axial direction) was increased and a synthesizing rate of 5 g/min was obtained.

In this EXAMPLE 4, the ratio between the flow rate of the hydrogen gas supplied to the inner flame and the flow rate of the hydrogen gas supplied to the outer flame of the double-flame burner for synthesizing a core thereof was 5:10 as in the case of EXAMPLE 3. The surface temperature at the leading end was maintained at about 700° C. by regulating the total flow rate of the hydrogen gas.

After the preform thus obtained was consolidated into a transparent glass preform, it is drawn into an optical fiber having an outer diameter 125 μm and a core diameter of 50 μm. The optical fiber thus obtained had excellent characteristics. For instance, its transmission loss was 0.40 dB/km (at a wavelength of 1.55 μm) and its transmission bandwidth was 960 MHz.km (at a wavelength of 1.3 μm).

As described above, it is now apparent that even in case of an all-synthesized optical fiber preform, a preform with an excellent transmission characteristics can be fabricated at a high fabrication rate in a stable manner by controlling the ratio between the flow rates of the hydrogen gas and the total flow rate of the hydrogen gas.

As described above, the surface temperature distribution can be controlled by regulating mainly the ratio between the flow rates of the hydrogen gas, and the surface temperature at the leading end can be controlled by regulating the total flow rate of the hydrogen gas. In this manner, any desired refractive index profile can be obtained. As is clear from the structure of the burner used, in response to the variation in the distance l between the inner flame and the outer flame, the ratio between the flow rates of the hydrogen gas for obtaining a desired temperature distribution is varied. However, even when a multi-flame burner having a different distance l and different dimensions is used, any desired refractive index profile can be obtained by controlling the ratio between the flow rate of the hydrogen gas supplied to the inner flame, and the flow rate of the hydrogen gas supplied to the outer flame, while measuring the surface temperature distribution.

While in EXAMPLES 3 and 4 described above, a glass raw material and an additive are supplied only to the inner multiple orifice assembly of a double-flame burner for synthesizing a core, it is to be understood that they may also be supplied to only the outer multiple orifice assembly. The passing time during which the glass raw material supplied to the outer multiple orifice assembly passes through only the outer flame is substantially similar to that attained by a conventional burner. Therefore, the effect of increasing the size of fine glass particles is not expected, but the total deposition amount of fine glass particles is increased. According to the present invention, if a glass material is also supplied to the outer multiple orifice assembly, it is clear that a deposition rate of a porous preform is increased, and that a concentration distribution of an additive or dopant is smooth in the outer region (that is, the boundary region between a core and a cladding). These effects may be advantageous in that a refractive index profile can be controlled to show a desired profile, if the effects are utilized auxiliarily, if necessary.

As described above, according to the present invention, any desired refractive index profile can be obtained by controlling not only the ratio between the flow rate of the hydrogen gas supplied to the inner multiple orifice assembly of a double-flame burner and the flow rate of the hydrogen gas supplied to the outer multiple orifice assembly thereof but also the total flow rate of the hydrogen gas. Furthermore, the present invention can be applied to a process in which a multiple-flame burner is used to synthesize a core. As a result, the optical fibers with an excellent transmission characteristics can be fabricated at a high fabrication rate and at a high yield and accordingly the cost of optical fibers can be remarkably reduced.

(3) All Synthesis:

When the whole or a substantial portion of an optical fiber preform is synthesized by using a plurality of burners for synthesizing fine glass particles, a multi-flame burner or multi-flame burners in accordance with the present invention can be provided as a burner or burners for forming a cladding. The high deposition rate of a multi-flame burner is fully utilized so that a desired cladding-to-core-diameter ratio can be obtained with a minimum number of burners.

EXAMPLES 5-7 of the all-synthesizing process in accordance with the present invention will be described.

EXAMPLE 5

Figure 14:
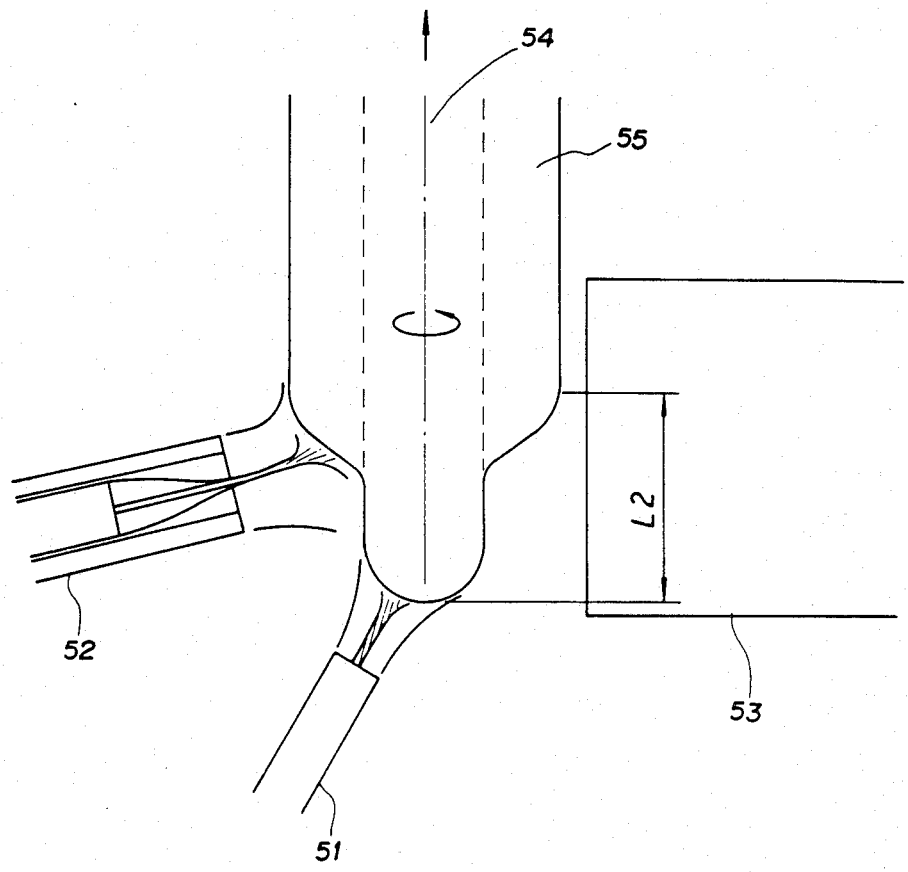
FIG. 14 is a schematic view showing an embodiment of a fabrication apparatus in accordance with the present invention in which a multi-flame burner is used to synthesize a cladding.

FIG. 14 shows an embodiment of an apparatus in accordance with the present invention used for the fabrication of multi-mode, graded index type fiber preforms by the all-synthesizing process. Reference numeral 51 designates a burner for synthesizing a core; 52, a multi-flame burner; 53, an exhaust pipe; 54, a synthesized porous core preform; and 55, a synthesized porous cladding preform. The burners 51 and 52 are inclined at an angle with respect to the direction in which a preform grows and the burner 51 is disposed below the burner 52.

The burner 51 was inclined at an angle within a range of 20°–65° relative to the vertical direction, for example 30°. The burner 52 is inclined at an angle within a range of 45°–90° relative to the vertical direction, for example 70°. The inclination of the burner 51 is determined in a manner that the glass raw material flow is stabilized and the inclination of the burner 52 is determined in a manner that the boundary surface between the core and the cladding does not have salient inflections of the shapes and sudden changes of the densities relative to the radial direction as shown in FIG. 14.

In this EXAMPLE 5, the burner 51 for synthesizing a core may be a conventional burner with a single concentrically annular orifice.

$SiCl_4$ and $GaCl_4$ were supplied as glass raw materials at a flow rate of 450 cc/min and at a flow rate of 40 cc/min, respectively, to the burner 51 for synthesizing a core. $SiCl_4$ was supplied at a flow rate of 2200 cc/min to the multi-flame burner 52 for synthesizing a cladding. A porous preform having an outer diameter of 150 mm and a core diameter of 60 mm was obtained. The synthesizing rate was 4.4 g/min (the core region was synthesized at a synthesizing rate of 0.7 g/min and the cladding region was synthesized at a synthesizing rate of 3.7 g/min). The calculated yield of the core region was 60% and the calculated yield of the cladding region was 70%. The yield of the cladding region is slightly higher than the yield of the core region. It is considered that this results from the multi-flame effect and the fact that the deposition area is increased due to the increase in diameter. As a result, an amount of the fine glass particles which are not deposited were reduced and no interference occurred because only one burner 52 for synthesizing a cladding was used. Therefore, the preform fabrication was carried out in a stable manner for a time period longer than 10 hours. Moreover, the length $L_2$ of the grown preform until the preform grows stably was 120 mm. In the case of a conventional process in which three conventional burners are disposed in three stages as burners for synthesizing a cladding region, the corresponding length $L_2$ is in general of the order of 220 mm. Thus, according to the present invention, the length $L_2$ can be reduced by about b 100 mm.

In the consolidation step, the porous preform thus obtained was dehydrated and shrunk at 1300° C. in a first sintering step while a chlorine-series dehydrating agent and a He gas were flowed. As a result, the porous preform having an initial outer diameter of about 150 mm was shrunk and the outer diameter was reduced to about 70 mm. The porous preform exhibited milky-white glassy surface. Thereafter, the porous preform was placed in an electric furnace having a diameter of 100 mm and was subjected to the high temperature heating treatment at 1550° C. in the He atmosphere, so that a transparent glass preform was obtained. Since the preform was sintered in the two steps as described above, the problem that the thermal efficiency drops due to the variation in diameter of the preform caused by the shrinkage thereof due to the large diameter of the porous preform and the deformation of a furnace muffle made of quartz were eliminated. The two-step consolidation treatment will be explained in detail in paragraph (5).

The large and transparent glass preform thus obtained was drawn into an optical fiber having a length of 4900 m and a refractive index difference of 1.0% and the transmission loss and the bandwidth were measured.

Figure 15:
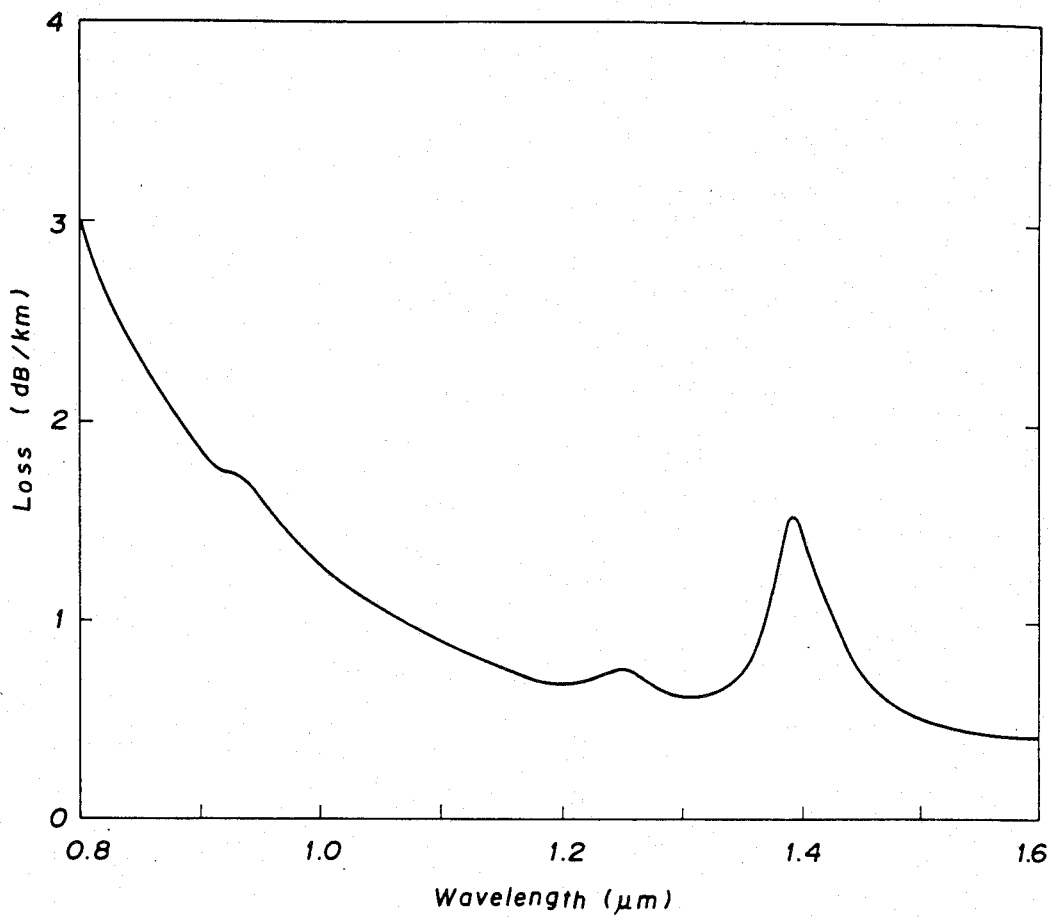
FIG. 15 illustrates characteristic curve of a transmission loss of an optical fiber fabricated by the fabrication apparatus shown in FIG. 14.

FIG. 15 shows the results of the transmission loss measurements. It is seen that the transmission loss is 2.35 dB/km at a wavelength of 0.85 μm; the transmission loss is 0.62 dB/km at a wavelength of 1.30 μm; and the transmission loss is 0.44 dB/km at a wavelength of 1.55 μm. An amount of OH estimated from the OH absorption peak at a wavelength of 1.39 μm was 30 ppb. The transmission bandwidth was 840 MHz·km at a wavelength of 1.3 μm. Thus, the present invention can obtain as excellent transmission characteristics as those attained by the conventional optical fiber fabrication process.

EXAMPLE 6

Figure 16:
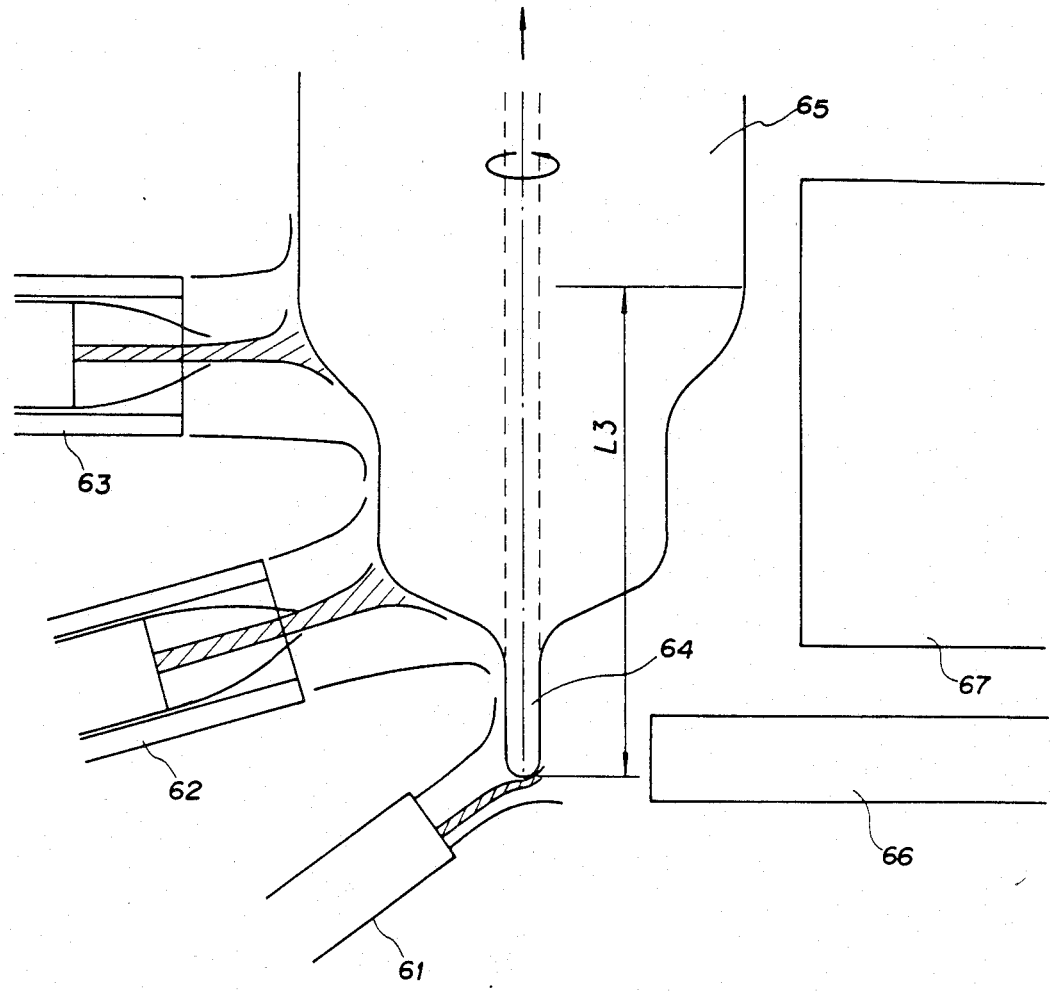
FIG. 16 is a schematic view showing a further embodiment of a fabrication apparatus in accordance with the present invention.

FIG. 16 shows an embodiment of an apparatus in accordance with the present invention used in the fabrication of single mode optical fiber preforms by the all-synthesizing process. In order to all-synthesize porous preforms for single mode optical fibers, it is required that a diameter of the porous preform for core is as small as 10-15 mm.

In FIG. 16, reference numeral 61 designates an eccentric burner for synthesizing a core preform of a small diameter; 62 and 63, multi-flame burners for synthesizing a cladding region; 64, a porous preform for core region; 65, a porous preform for cladding region; and 66 and 67, exhaust pipes for discharging the fine glass particles which are not deposited. The burners 61, 62 and 63 are inclined at angles of 50°, 70° and 90° with respect to the vertical direction in which a preform is grown, respectively and the burner 61 is disposed under the burner 62 which in turn is disposed under the burner 63. The length $L_3$ is a length of a grown preform formed until the preform grows to be steady state.

As shown in FIG. 16, the porous preform 64 which has a small diameter and corresponds to a core was synthesized by using the eccentric burner 61 for synthesizing a preform of a small diameter. Thereafter, the fine glass particles which were synthesized by the double-flame burners 62 and 63 were layered on the core preform 64 to form the cladding region 65. In this EXAMPLE, $SiCl_4$ and $GeCl_4$ were supplied as glass raw materials at a flow rate of 70 cc/min and at a flow rate of 5 cc/min, respectively, to the eccentric burner 61. $SiCl_4$ was supplied at a flow rate of 2200 cc/min to the first double-flame burner 62 for forming a first cladding layer and $SiCl_4$ was also supplied at a flow rate of 3000 cc/min to the second double-flame burner 63 for forming a second cladding layer on the first cladding layer. The core region was synthesized at a deposition rate of about 0.06 g/min. The first cladding layer was synthesized at a deposition rate of 4 g/min and the second cladding layer was synthesized at a deposition rate of 6 g/min. The yield of the core region was 50%. The yield of the first cladding layer was 70% and the yield of the second cladding layer was 75%. The core region 64 had a diameter of 15 mm and the total porous preform had a diameter of 190 mm. Care was taken to prevent the increase in difference in density at the boundaries between the regions of the porous preform.

In order to consolidate the porous preform thus obtained, the preform was placed into an electric furnace with an inner diameter of 220 mm and was subjected to a first sintering step at 1300° C. in the helium and chlorine atmosphere. Thereafter, the shrunk preform was placed in another electric furnace having an inner diameter of 100 mm and was heated at 1500° C. in the electric furnace. The core region of the transparent consolidated preform thus obtained had a diameter of 7 mm and the transparent consolidated preform had an outer diameter of 85 mm. The transparent preform was then elongated to 25 mm in outer diameter and was heated at 2000° C. so that an optical fiber having an outer diameter of 125 μm and a core diameter of 10 μm was drawn.

The difference in refractive indexes of the optical fiber thus obtained was 0.3% and the transmission loss was 0.36 dB/km at a wavelength of 1.55 μm, which is substantially equal to the transmission loss of the optical fibers fabricated by a conventional process.

EXAMPLE 7

Figure 17:
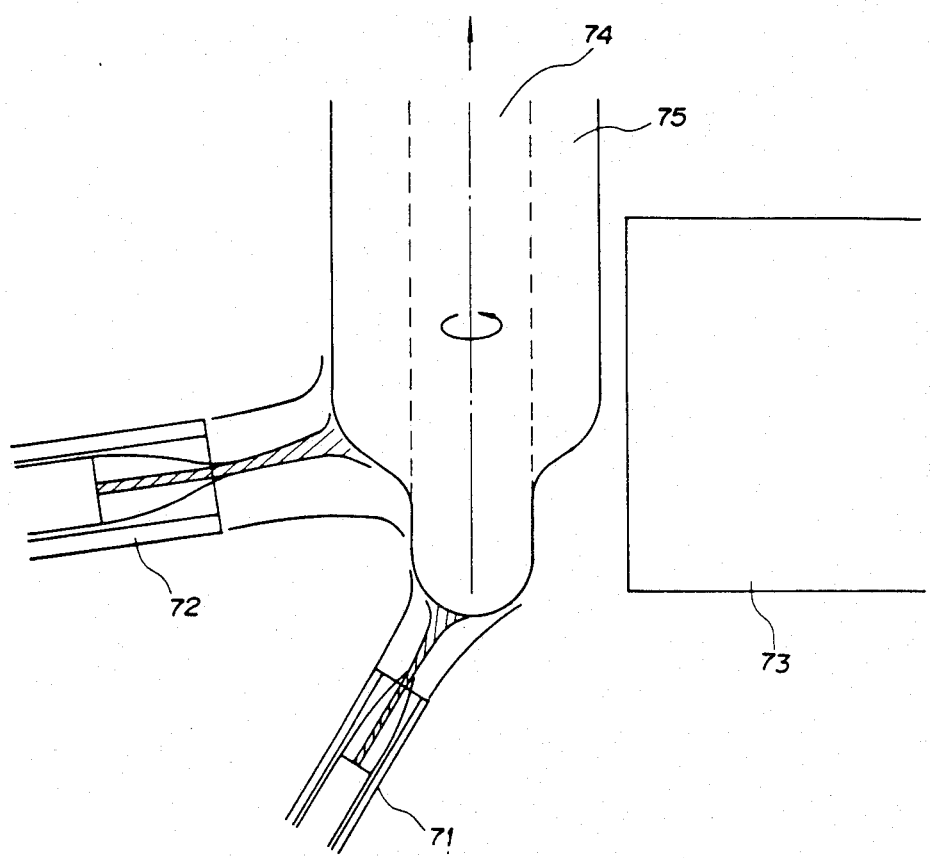
FIG. 17 is a schematic view showing a further embodiment of a fabrication apparatus in accordance with the present invention.

FIG. 17 shows an embodiment of an apparatus in accordance with the present invention for fabricating all-synthesized preforms of graded index type by using a double-flame burner of a samll diameter for synthesizing a core region. Here, reference numeral 71 denotes a multi-flame burner of a small diameter; 72, a multi-flame burner for synthesizing a cladding region; 73, an exhaust pipe; 74, a porous core region preform; and 75, a porous cladding region preform. The burners 71 and 72 are inclined at angles of 30° and 70° with respect to the vertical direction in which a preform is grown, respectively, and the burner 72 is disposed above the burner 71. In this EXAMPLE, the apparatus shown in FIG. 17 is the same as the apparatus shown in FIG. 13 except the burner 51 for synthesizing a core region of the type described in EXAMPLE 5 is replaced by the multi-flame burner 71 of a small diameter for synthesizing a core region.

Like the case of EXAMPLE 5, $SiCl_4$ and $GeCl_4$ were supplied as glass raw materials at a flow rate of 450 cc/min and at a flow rate of 40 cc/min, respectively, to the multi-flame burner 71 of a small diameter for synthesizing a core region. The diameter of the core region 74 of the porous preform thus obtained was as small as 55 mm and the pulling up speed was increased by 1.6 times, compared with a conventional single-flame burner. As a result, in order to control the cladding-core-diameter ratio, it was necessary to supply $SiCl_4$ at a flow rate of 2500 cc/min to the multi-flame burner 72 for synthesizing a cladding region.

The porous preform thus obtained had an outer diameter of 140 mm. As the outer diameter is decreased, the pulling up speed (that is, the growing rate in the axial direction) became faster and the deposition rate of 5 g/min was obtained. In this EXAMPLE, the double-flame burner 71 of a small diameter for synthesizing a core region was used and it was confirmed that the yield of the core region was increased from 60% to 70% as compared with EXAMPLE 5.

Following the fabrication of the porous preform like in EXAMPLE 5, the porous preform was consolidated into a transparent preform and then drawn into an optical fiber having a diameter of 125 μm. The transmission loss of the optical fiber thus obtained was 0.46 dB/km at a wavelength of 1.55 μm, which is extremely excellent.

While in EXAMPLES 5-6 the all-synthesizing process in which all the core region consists of a porous preform and all the cladding region also consists of a porous preform, it is to be understood that large-sized preforms can be fabricated at a high fabrication rate and at a high yield, even when a jacket made of a quartz tube is additionally used to control the final diameter of a preform.

As described above, according to the present invention, the burners for synthesizing porous preforms includes at least one multi-flame burner, so that large-sized porous preforms is synthesized at a high fabrication rate. As a result, even in the case of synthesizing single mode fiber preforms with a high cladding-to-core-diameter ratio, the number of burners used can be reduced to a minimum and accordingly non-stability in fabrication is eliminated.

Moreover, according to the present invention, at least a porous cladding region preform is synthesized by a multi-flame burner. Therefore, as compared with the preforms synthesized by a conventional burner, the density and the mechanical strength of the porous cladding region preform can be increased. Consequently, the large-sized preform can be maintained in a stable manner. As is clear from the description of EXAMPLES 5–7 of the present invention, these effects are very advantageous especially in the case of the synthesis of a preform by the VAD process in which an axially extended supporting rod is not used.

Furthermore, according to the present invention, a core region and a cladding region can be simultaneously synthesized at a high fabrication rate and at a high yield, so that the mass production of optical fibers with excellent characteristics is realized and the present invention greatly contributes to the reduction the cost of optical fibers which are expected to be used in a large amount in the future.

(4) Consolidation Conditions:

The inventors conducted experiments in which preforms were heated and consolidated into a transparent glass body at various temperature increase rate and found out that a temperature increase rate less than 5° C./min is preferable.

There are two methods for accomplishing a temperature increase rate of less than 5° C./min. In one method, a porous preform is located at a predetermined position in an electric furnace and then a furnace temperature is slowly increased. In the other method, a porous preform is moved at a slow speed toward the high temperature region in an electric furnace. At a temperature increase rate of less than 5° C./min, a porous preform becomes transparent or consolidated.

COMPARATIVE EXAMPLE 1

A large-sized porous preform having an outer diameter of 130 mm was fabricated by using a double-flame burner. $SiCl_4$ and $GeCl_4$ were supplied to the inner flame and $SiCl_4$ was supplied to the outer flame. The porous preform was synthesized at a deposition rate of 3–4 g/min. The porous preform thus obtained was sliced to form a disc with a thickness of about 80 mm and the disc-shaped porous preform was placed at the uniformly heated portion in the electric furnace and was consolidated by heating it from room temperature to a predetermined high temperature (the maximum temperature was 1600° C.) in the He gas atmosphere. The furnace muffle was made of quartz glass and had an inner diameter of about 140 mm.

The above-mentioned preform fabricated by the high rate synthesizing process contained $GeO_2$ of about 8–10% by weight. The porous preforms fabricated by the conventional VAD process can be consolidated at about 1450°–1500° C.

The preforms fabricated by the high rate synthesizing process were subjected to a high temperature treatment at 1450° C., 1500° C., 1550° and 1600° C. The temperature increase rate was 10° C./min. Neither of the preforms was not transparent. At the lower treatment temperature, the less transparent preform was obtained.

Figure 18:
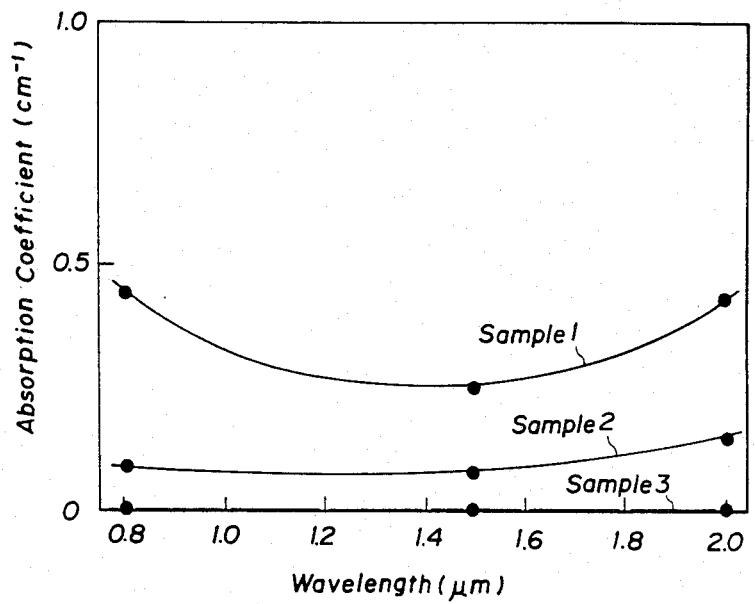
FIG. 18 illustrates the relationships between a wavelength and an absorption coefficient of the glass samples (sample 1 and sample 2) which were subjected to the high temperature treatment at 1500° C. and 1600° C., respectively, (the temperature being raised at a rate of 10° C./min) and the glass sample (sample 3) which was subjected to the high temperature treatment at 1550° C. (the temperature being raised at a rate of 5° C./min)

FIG. 18 is a graph illustrating the relationship between a wavelength and an absorption coefficient of the consolidated glass samples (having a thickness of 1, 5 and 10 mm) obtained by the high temperature treatment (at a temperature increase rate of 10° C./min) in which the sample 1 was heated at 1500° C. and the sample 2 was heated at 1600° C. and the sample 3 (see EXAMPLE 8 hereinafter) was heated at 1550° C. at a temperature increase rate of less than 5° C./min. It is seen from FIG. 18 that when the samples are heated at a temperature increase rate of 10° C./min, the higher the heat treatment temperature, the more transparent the preform. The sample 2 shows that the preform was not sufficiently consolidated when it was heated at 1600° C.

As a result, there arises a problem that bubbles come out when the preform which is not sufficiently consolidated is heated by an oxygen-hydrogen burner and elongated so as to be fitted into a jacket tube in preparation of the drawing step.

EXAMPLE 8 AND COMPARATIVE EXAMPLE 2

Porous preforms were synthesized at a high deposition rate under the same conditions as COMPARATIVE EXAMPLE 1. The porous preforms were consolidated at various temperature increase rates under the same conditions as COMPARATIVE EXAMPLE 1. The temperature increase rates were 7° C./min, 5° C./min, 3° C./min and 1° C./min. The consolidation temperature was 1550° C. When the porous preform was heated at a rate of 7° C./min, it is still opaque and heavy fluctuation in the fiber diameter was observed during the fiber drawing from this preform. When the porous preform was heated at a slow temperature increase rate of 5° C. or less, the preform became transparent (the sample 3 in FIG. 18). The same results were obtained when the porous preforms were heated at a rate of 3° C./min and at a rate of 1° C./min. The similar results were obtained when porous preforms were heated at 1600° C.

In summary, in order to obtain a transparent preform, it is necessary that a porous preform is heated at a temperature increase rate of 5° C./min or less.

EXAMPLE 9

Figure 19:
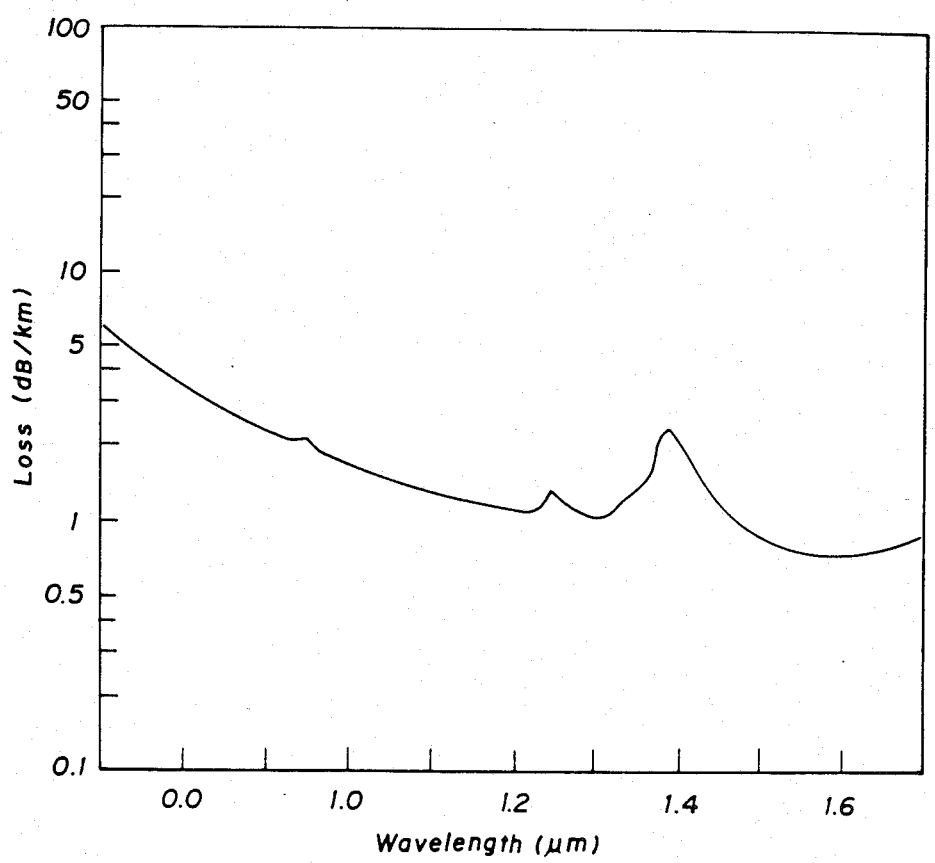
FIG. 19 illustrates the relationship between a wavelength and a transmission loss of an optical fiber obtained from a preform which is consolidated into a transparent glass body by the process of the present invention.

A preform fabricated by the high speed synthesizing process was heated at 1550° C. at a temperature increase rate of 3° C./min with flowing a chlorine-series dehydrating agent, so that the preform was consolidated into a transparent preform. An optical fiber was drawn from the transparent preform thus obtained and its transmission loss characteristic was measured. The results were shown in FIG. 19, in which the wavelength ($\mu$m) is plotted along the abscissa while the transmission loss (dB/km) is plotted along the ordinate.

The loss was about 0.7 dB/km at a wavelength of 1.6 $\mu$m and was substantially equal to the transmission loss of a conventional optical fiber.

In the above-described EXAMPLE 9, the porous preform was placed at a predetermined position (at the uniformly heated position at the center of the electric furnace) and the heating temperature was increased so as to consolidate the porous preform. It is to be understood that a porous preform may be introduced into the high temperature region in the electric furnace at a slow speed after the electric furnace is heated to a predetermined temperature. In this case, it is of course apparent that the porous preform is inserted into the electric furnace at a speed corresponding to a temperature increase rate of 5° C./min or less.

For instance, a transparent preform was obtained by inserting a preform, which was fabricated by the high speed synthesizing process and which had a diameter of 130 mm, at a speed of 90 mm/hr into an electric furnace which was maintained at the maximum temperature of 1550° C.

Figure 20:
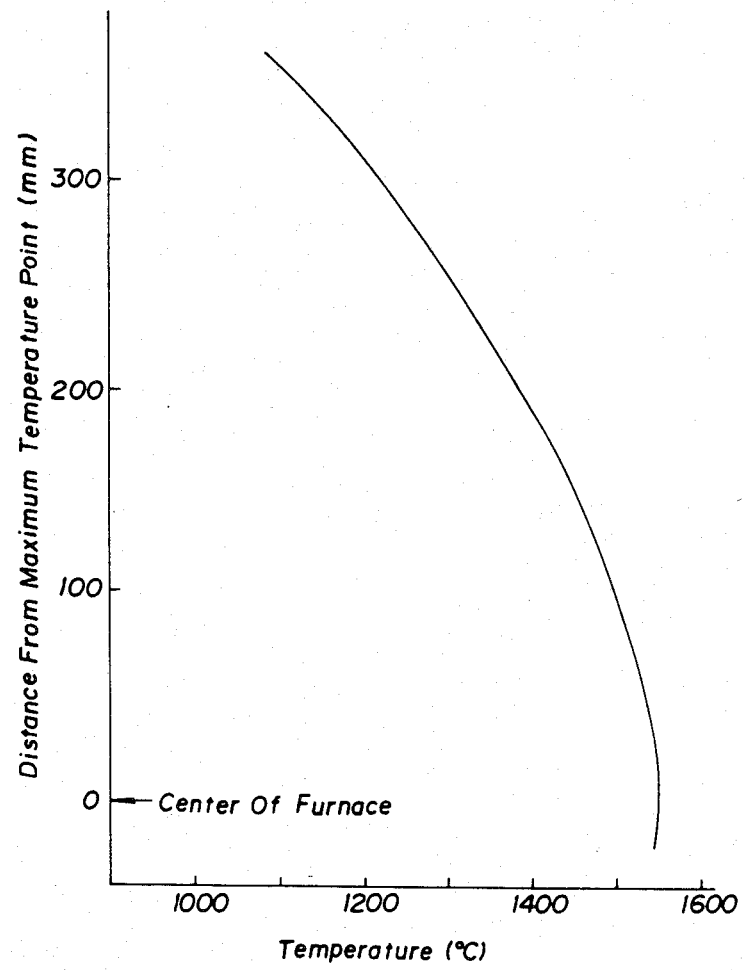
FIG. 20 illustrates an example of a temperature distribution in an electric furnace used in the consolidation step in a fabrication method in accordance with the present invention.

FIG. 20 is a graph illustrating a temperature distribution in the electric furnace used for consolidating the porous preform in accordance with the present invention. The temperature (°C.) is plotted along the abscissa while the distance (mm) from the center of the electric furnace is plotted along the ordinate.

An insertion speed can be converted into a temperature increase rate by the following manner to be described below. It is assumed that a temperature gradient in a temperature region between 1100° C. and 1400° C. in which the shrinkage of a porous preform occurs is determined to be 1.3° C./mm from the temperature distribution curve shown in FIG. 20. Then, an insertion speed of 90 mm/hr corresponds to a temperature increase rate of about 2° C./min, which of course satisfies the condition of the present invention that a temperature increase rate must be equal to or less than 5° C./min.

As described above, according to the present invention, a porous preform which are synthesized at a high rate by using a multi-flame burner is consolidated into a transparent glass preform by heating the porous preform at a slow temperature increase rate of 5° C./min or less or by inserting the porous preform at a slow insertion speed, which corresponds to a temperature increase rate equal to or less than 5° C./min, into a high temperature region. As a result, an optical fiber with excellent characteristics can be mass-produced at a reduced cost.

(5) Consolidation Treatment

In order to consolidate a porous preform, the porous preform must be heated to be shrunk, but prior to the shrinkage, the preform must be subjected to a dehydration treatment which requires a large furnace. Since muffle of a large furnace is made of quartz glass, the heating temperature cannot be raised beyond a certain temperature. Therefore, the inventors made the extensive studies on the relationship between a shrinkage temperature of a porous preform and a temperature at which a quartz glass muffle can be used and studied a heating temperature at which a suitable dehydration treatment is performed and a minimum degree of required shrinkage of a porous preform can be obtained without adversely affecting the muffle.

Figure 21:
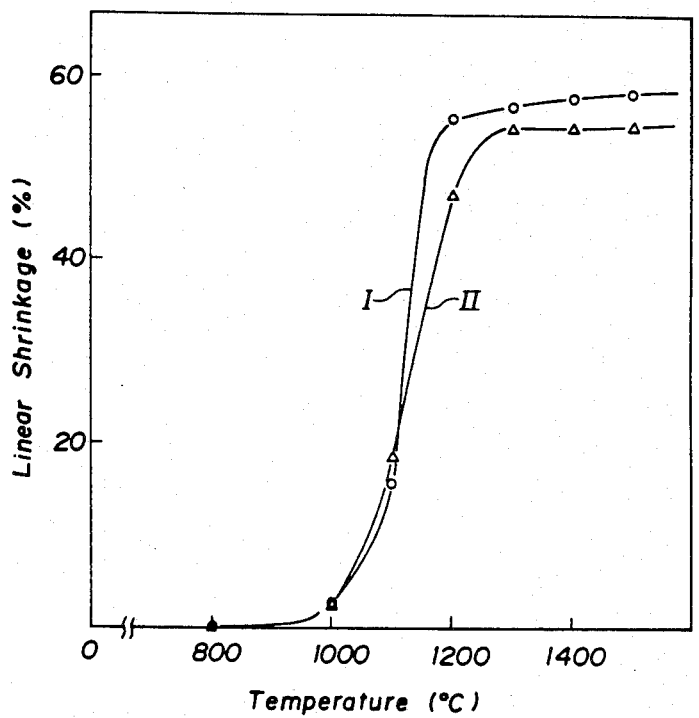
FIG. 21 illustrates the relationship between a temperature and porous preform shrinkage.

FIG. 21 shows the relationship between a heating temperature and a linear shrinkage ratio in percent based on the results obtained when a porous preform was sliced and was subjected to a heat treatment at various temperatures in the helium atmosphere.

The linear shrinkage ratio k is defined by $$k = \Delta l / l_o = (l_o - l) / l_o,$$

where $l_o$ is the length of a porous preform prior to a heat treatment, and $l$ is the length of the porous preform after the heat treatment.

The characteristic curve I was obtained when a porous preform contained a relatively large amount of $GeO_2$ and the characteristic curve II was obtained when a porous preform contained a relatively small amount of $GeO_2$.

It is seen from FIG. 21 that the temperature at which the shrinkage starts is dependent upon a $GeO_2$ concentration and an initial density of a porous preform and that the shrinkage, i.e., consolidation starts at about 1000° C. and is saturated at a shrinkage ratio of about 50% at 1200°–1300° C. A porous preform is not transparent at 1300° C., and is transparent at about 1500° C.

According to the present invention, therefore, a porous preform is shrunk at a temperature, for instance 1300° C., which is lower than a consolidation temperature of 1500° C., at which a porous preform is transparent, without causing any adverse effect on the muffle of the furnace. Thereafter, in order to make the shrunk porous preform thus obtained transparent, the preform is placed into a small furnace having a muffle made of carbon capable of withstanding a high temperature as high as 1500° C. and is heated again at a consolidation temperature, so that the porous preform is rendered transparent.

An embodiment of the present invention in which the heat treatment is carried out in two steps as describe above will be described below.

EXAMPLE 10

Figure 22:
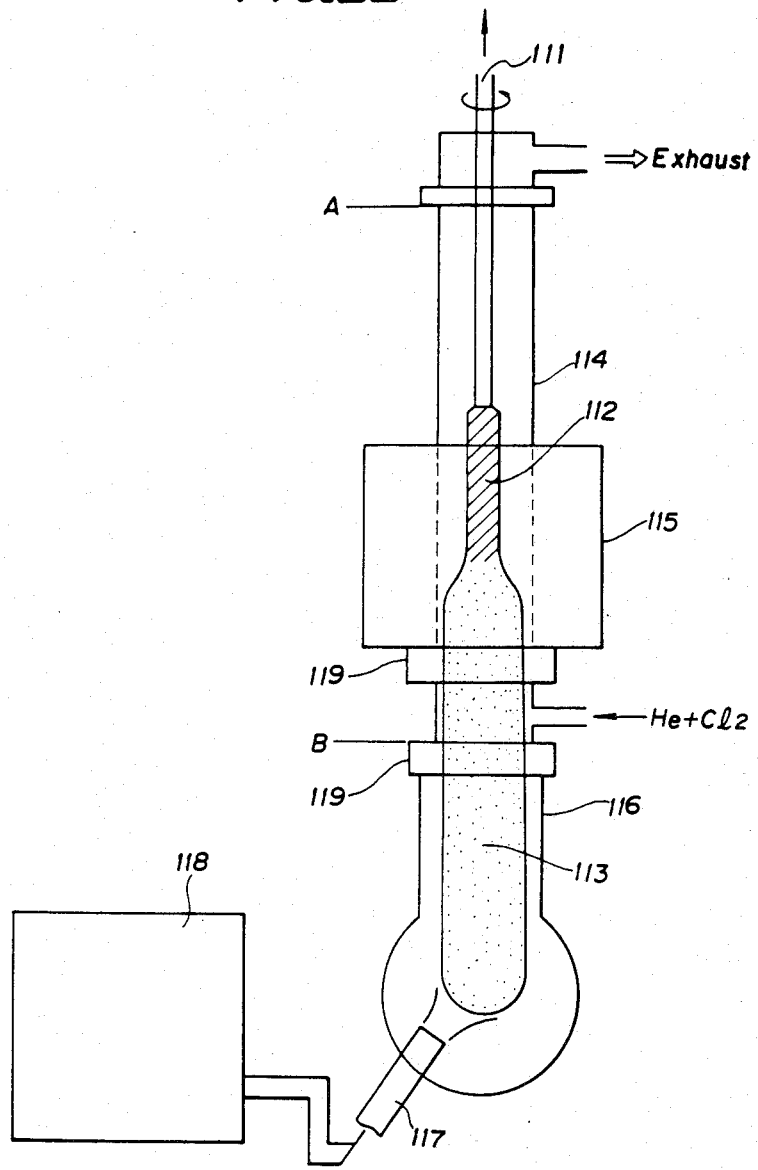
FIG. 22 is a schematic view showing an embodiment of an apparatus for fabricating optical fiber preforms in accordance with the present invention.

FIG. 22 shows an embodiment of an optical fiber preform fabrication apparatus used in this EXAMPLE. Reference numeral 111 denotes a seed rod of quartz glass; 112, a preform which is shrunk but is not transparent; 113, a porous preform; 114, a furnace muffle of quartz glass; 115, an electric furnace; 116, a Pyrex glass reaction vessel; 117, a synthesizing burner made of quartz glass; 118, a glass material supply system; and 119, a glass seal. The electric furnace 115 which is used in this EXAMPLE has a carbon heating element having an inner diameter of 160 mm. The furnace walls are water-cooled and no special pressure adjustment is needed. The muffle 114 has flanges at positions A and B for ensuring the gas-tightness of the muffle 114.

The porous preform 113 which was formed by the deposition in the reaction vessel 116 was shrunk in the electric furnace 115 maintained at 1300° C. and was derived as the shrunk preform 112 which was not transparent. In this EXAMPLE, the chlorine gas was used to dehydrate the porous preform 113. The shrunk preform 112 was discharged from the electric furnace 115 and was heated again at 1500° C. in the second electric furnace so that the shrunk preform was consolidated into a transparent preform. In this case, no chlorine gas flowed and only helium gas flowed in the electric furnace which had a furnace muffle made of carbon. As a result, the consumption and deformation of the carbon muffle were not observed.

The deposited porous preform had an outer diameter of 130 mm and the shrunk preform 112 had an outer diameter of 54 mm. The transmission loss of the optical fiber obtained from the consolidated preform was substantially equal to that of the optical fiber fabricated by the conventional process. No pressure adjustment was made, but the outer appearance of the furnace muffle made of quartz glass 114 remained unchanged after heating. The sinterring degree of the shrunk preform 112 was higher than the porous preform 113 and the preform 112 was smaller in size than the porous preform 113, so that the preform 112 can be discharged and handled easily.

As described above, according to the present invention, the consumption of the quartz glass furnace muffle is reduced. It is not necessary to control the pressures in the electric furnace and in the furnace muffle, so that the operation of the electric furnace is simplified and the yield of the optical fiber preform is increased due to the reduction of miss treatments. As a result, optical fibers can be fabricated at low costs.

Furthermore, the sinterring process can be carried out continuously even when an optical fiber preform is fabricated at a high rate and a high pulling up speed, so that the cost of the optical fiber preform can be reduced. The present invention may be equally applied not only to the fabrication of optical fibers but also to the production of glass rods made of pure $SiO_2$ or the like.

What is claimed is:

1. An optical fiber preform fabrication method comprising the steps of:
   using a burner having a central raw material supply orifice for supplying a glass raw material and a plurality of flame forming orifices disposed around said raw material supply orifice sequentially for forming a plurality of flames, respectively, the number of flames being at least equal to $k+1$;
   determining and controlling the flame speed $V_k$ of, a kth flame, the flame speed $V_{k+1}$ of a $(k+1)$th flame outwardly surrounding said kth flame and the flow speed Vm of the glass raw material supplied through the center of the buner in such a way that the following relations are satisfied:

$0.1V_{k+1} \leq Vk \leq 2.5V_{k+1},$ $Vm \leq V_{k+1}$ and $Vm \leq V_k;$ supplying combustion gases to said flame forming orifices and combusting to provide said flames;
   supplying said glass raw material to the multiflame produced by said burner in which the kth flame is positioned axially rearwardly of the $(k+1)$th flame to synthesize fine glass particles;
   depositing said fine glass particles on a seed rod to form a porous preform; and
   consolidating said porous preform into a transparent optical fiber preform.

2. An optical fiber preform fabrication method as claimed in claim 1, wherein the following relation is satisfied:

$V_{k+1} = V_k \geq V_m.$

3. An optical fiber preform fabrication method as claimed in claim 1, wherein a ratio between the flow rates of combustible gases supplied to said plurality of flame forming orifices of said burner and an overall flow rate of said combustible gases supplied to said plurality of flame forming orifices are controlled in accordance with a predetermined concentration distribution of an additive.

4. An optical fiber preform fabrication method as claimed in claim 1, wherein said porous preform is heated at a temperature increase rate of 5° C./min or less to consolidate said porous preform into said transparent optical fiber preform.

5. An optical fiber preform fabrication method as claimed in claim 1, wherein said porous preform is heated at a temperature which is lower than the consolidation temperature of said porous preform and at which said porous preform is shrunk, and thereafter the shrunk preform is heated again at said consolidation temperature.

6. An optical fiber preform fabrication method comprising the steps of:
   using a burner having a central raw material supply orifice for supplying a glass raw material and a plurality of flame forming orifices disposed around said raw material supply orifice sequentially for forming a plurality of flames, respectively, the number of flames being at least equal to $k+1$;
   determining and controlling the flame speed $V_k$ of a kth flame, the flame speed $V_{k+1}$ of a $(k+1)$th flame outwardly surrounding said kth flame and the flow speed Vm of the glass raw material supplied through the center of the burner in such a way that the following relations are satisfied:

$0.1V_{k+1} \leq Vk \leq 2.5V_{k+1},$ $Vm \leq V_{k+1}$ and $Vm \leq V_k;$ positioning said kth flame axially rearwardly of said $(k+1)$th flame outwardly surrounding said kth flame in such a way that the downstream end of said kth flame is substantially continuous to the upstream end of said $(k+1)$th flame;
   supplying combustion gases to said flame forming orifices and combusting to provide said flames;
   supplying said glass raw material to the multiflame produced by said burner to synthesize fine glass particles;
   depositing said fine glass particles on a seed rod to form a porous preform; and
   consolidating said porous preform into a transparent optical fiber preform.

7. An optical fiber preform fabrication method as claimed in claim 6, wherein the following relation is satisfied:

$V_{k+1} = V_k \geq V_m.$

8. An optical fiber preform fabrication method as claimed in claim 6, wherein a ratio between the flow rates of combustible gases supplied to said plurality of flame forming orifices of said burner and an overall flow rate of said combustible gases supplied to said plurality of flame forming orifices are controlled in accordance with a predetermined concentration distribution of an additive.

9. An optical fiber preform fabication method as claimed in claim 6, wherein said porous preform is heated at a temperature increase rate of 5° C./min or less to consolidate said porous preform into said transparent optical fiber preform.

10. An optical fiber preform fabrication method as claimed in claim 6, wherein said porous preform is heated at a temperature which is lower than the consolidation temperature of said porous preform and at which said porous preform is shrunk, and thereafter the shrunk preform is heated again at said consolidation temperature.

* * * * *

UNITED STATES PATENT AND TRADEMARK OFFICE
CERTIFICATE OF CORRECTION

PATENT NO. : B1 4,618,354
DATED : February 19th, 1991
INVENTOR(S) : Hiroyuki SUDA ET AL.

It is certified that error appears in the above-indentified patent and that said Letters Patent is hereby corrected as shown below:

On the title page, insert the following:

--[73] Assignee:  Nippon Telegraph & Telephone Corporation, Tokyo, Japan --

Signed and Sealed this

Nineteenth Day of April, 1994

Attest:

BRUCE LEHMAN

*Attesting Officer*  *Commissioner of Patents and Trademarks*

REEXAMINATION CERTIFICATE (1416th)
United States Patent [19]
Suda et al.

[11] B1 4,618,354

[45] Certificate Issued Feb. 19, 1991

[54] METHOD, APPARATUS AND BURNER FOR FABRICATING AN OPTICAL FIBER PREFORM

[75] Inventors: Hiroyuki Suda; Shuichi Shibata; Motohiro Nakahara, all of Mito, Japan

[73] Assignees: Sumitomo Electric Industries Ltd., Osaka; Nippon Telegraph & Telephone Public Corporation, Tokyo, both of Japan

Reexamination Request:
No. 90/001,613, Oct. 3, 1988

Reexamination Certificate for:
Patent No.: 4,618,354
Issued: Oct. 21, 1986
Appl. No.: 705,362
Filed: Feb. 25, 1985

[30] Foreign Application Priority Data

| | | | |
|---|---|---|---|
| Feb. 27, 1984 | [JP] | Japan | 59-34300 |
| Mar. 1, 1984 | [JP] | Japan | 59-37223 |
| Feb. 12, 1985 | [JP] | Japan | 60-23486 |
| Feb. 12, 1985 | [JP] | Japan | 60-23487 |
| Feb. 12, 1985 | [JP] | Japan | 60-23488 |

[51] Int. Cl.$^5$ .......................... C03B 37/018
[52] U.S. Cl. ........................ 65/2; 65/3.12; 65/18.2
[58] Field of Search ............ 427/163, 166, 167, 168; 239/424, 79, 85; 65/2, 3.12, 29, 18.2, 144, 157

[56] References Cited

U.S. PATENT DOCUMENTS

| | | | |
|---|---|---|---|
| 2,188,121 | 1/1940 | Smith | 65/3.12 |
| 3,050,374 | 8/1962 | Burt | 239/419.3 |
| 3,292,868 | 12/1966 | McCartney | 239/422 |
| 3,423,028 | 1/1969 | Stupakis | 239/424 |
| 3,806,570 | 4/1974 | Flamenbaum | 65/18.2 |
| 3,868,170 | 2/1975 | DeLuca | 65/3.12 |
| 4,304,583 | 12/1981 | Aronson | 65/18.2 |
| 4,338,111 | 7/1982 | Edahiro | 65/18.2 |
| 4,345,928 | 8/1982 | Kawachi | 65/18.2 |
| 4,368,846 | 1/1983 | Rau | 239/85 |
| 4,378,985 | 4/1983 | Powers | 65/3.12 |
| 4,388,098 | 6/1983 | Takahashi | 65/157 |
| 4,428,762 | 1/1984 | Andrejco | 65/18.2 |
| 4,474,593 | 10/1984 | Andrejco | 65/3.12 |

FOREIGN PATENT DOCUMENTS

| | | | |
|---|---|---|---|
| 11311060 | 11/1951 | France | |
| 56-37179 | 8/1981 | Japan | 65/3.12 |
| 59-124303 | 7/1984 | Japan | |
| 2059944 | 4/1981 | United Kingdom | |

OTHER PUBLICATIONS

Perry'Chemical Engineering Handbook, 6th Ed.; McGraw Hill Book Company, N.Y., 1984; pp. 5-6.
Suda; "High Rate Synthesizing Technique for Optical Fiber Preform by VAD Method"; 1983, Report #367, National Conference of Semiconductor Material Sec. in Assoc. of Japanese Electric Communications Soc.
"Fine Glass Particle Deposition Mechanism in the VAD Process", Fiber and Integrated Optics, vol. 4, No. 4, 1983 by H. Suda et al.
"Refractive-Index Profile Control Techniques in the Vapor-Phase Axial Deposition Method", The Transactions of the Institute of Electronics and Communications Engineers of Japan, vol. E64, No. 8, Aug. 1981, by Sudo et al.
"Formation Mechanism of Refractive-Index Profile in VAD Optical Fibers", Transactions of the Institute of Electronics and Communications Engineers of Japan, by Kawachi et al., vol. J-65C, No. 4, 1982, pp. 292-299.
"High-Rate Deposition VAD Method", Suda et al., Report No. 1138, 1984, National Conference of Semiconductor Material, Assoc. of Japan Electric Communications Soc.
"Double Flame VAD Process for High-Rate Optical Preform Fabrication", Suda et al., Electronic Letters, 3 Jan. 1985, vol. 21, No. 1, pp. 29-30.

*Primary Examiner*—Kenneth M. Schor

[57] ABSTRACT

In an optical fiber preform fabrication method having the steps of decomposing a glass raw material in a flame so that fine glass particles are produced; depositing the fine glass particles on a seed rod to form a porous preform; and consolidating the porous preform into a transparent optical fiber preform, use is made of a burner having a raw material supply orifice for supplying the glass raw material and a plurality of flame forming orifices disposed around the raw material supply orifice sequentially for forming a plurality of flames, respectively. The flame speed $V_k$ of the kth flame, the flame speed $V_{k+1}$ of a (k+1)th flame surrounding outwardly of the kth flame and the flow speed Vm of the glass raw material are determined in a suitable manner. The glass raw material is supplied to the [maluti-flame] *multi-flame* produced by the burner in which the kth flame is positioned rearwardly of the (k+1)th flame to synthesize the fine glass particles.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6-10 is confirmed.

Claim 1 is determined to be patentable as amended.

Claims 2-5, dependent on an amended claim, are determined to be patentable.

1. An optical fiber preform fabrication method comprising the steps of:

using a burner having a central raw material supply orifice for supplying a glass raw material and a plurality of flame forming orifices disposed around said raw material supply orifice sequentially for forming a plurality of flames, respectively, the number of flames being at least equal to k+1;

determining and controlling the flame speed $V_k$ of[,] a kth flame, the flame speed $V_{k+1}$ of a (k+1)th flame outwardly surrounding said kth flame and the flow speed Vm of the glass raw material supplied through the center of the [buner] *burner* in such a way that the following relations are satisfied:

$0.1V_{k+1} \leq V_k \leq 2.5V_{k+1}$, $Vm \leq V_{k+1}$ and $Vm \leq V_k$;

supplying combustion gases to said flame forming orifices and combusting to provide said flames;

supplying said glass raw material to the multiflame produced by said burner in which the kth flame is positioned axially rearwardly of the (k+1)th flame to synthesize fine glass particles;

depositing said fine glass particles on a seed rod to form a porous preform; and consolidating said porous preform into a transparent optical fiber preform.

* * * * *